US007600323B2

(12) United States Patent
Sugishita

(10) Patent No.: US 7,600,323 B2
(45) Date of Patent: Oct. 13, 2009

(54) AUTO CHAIN TENSIONER

(75) Inventor: Yuu Sugishita, Kawagoe (JP)

(73) Assignee: Husqvarna Zenoah Co., Ltd., Saitama (JP)

( * ) Notice: Subject to any disclaimer, the term of this patent is extended or adjusted under 35 U.S.C. 154(b) by 0 days.

(21) Appl. No.: 12/351,038

(22) Filed: Jan. 9, 2009

(65) Prior Publication Data

US 2009/0119934 A1 May 14, 2009

Related U.S. Application Data

(62) Division of application No. 10/556,762, filed as application No. PCT/JP2004/006847 on May 20, 2004.

(30) Foreign Application Priority Data

May 20, 2003 (JP) ............................ 2003-142398

(51) Int. Cl.
*B23D 57/02* (2006.01)

(52) U.S. Cl. ........................................................ 30/386

(58) Field of Classification Search ................... 30/386; 83/816, 818

See application file for complete search history.

(56) References Cited

U.S. PATENT DOCUMENTS

| | | | | |
|---|---|---|---|---|
| 3,194,284 | A | 7/1965 | Walker | |
| 3,636,995 | A | 1/1972 | Newman | |
| 4,129,943 | A | 12/1978 | Bricker et al. | |
| 5,491,899 | A | 2/1996 | Schliemann et al. | |
| 5,522,143 | A | 6/1996 | Schliemann et al. | |
| 6,237,228 | B1 | 5/2001 | Moody | |
| 6,493,949 | B2 | 12/2002 | Kondo et al. | |
| 6,564,459 | B1 | 5/2003 | Steinbrueck et al. | |
| 6,782,627 | B2 | 8/2004 | Hermes et al. | |
| 6,877,233 | B1 | 4/2005 | Franke | |
| 2002/0124421 | A1 | 9/2002 | Hermes et al. | |
| 2003/0024129 | A1 | 2/2003 | Franke et al. | |
| 2006/0075644 | A1 * | 4/2006 | Keeton et al. | 30/386 |

FOREIGN PATENT DOCUMENTS

| | | |
|---|---|---|
| JP | 2729582 | 12/1997 |
| JP | 3085277 | 2/2002 |
| JP | 3312777 | 5/2002 |
| WO | WO-01/03896 | 1/2001 |

* cited by examiner

*Primary Examiner*—Kenneth E. Peterson
(74) *Attorney, Agent, or Firm*—Darby & Darby P.C.

(57) ABSTRACT

The invention relates to an auto tensioner of a chain saw. A spiral guide groove (16) of the disk (15) engages with a protrusion 10*a* of a slider piece (10) and the slider piece (10) is slidably stored in a guide portion (9) formed in a chain cover (2) via a spring (14). A tensioner (11) comprising a protrusion (11) engaged with a guide bar is slidably stored in the slider piece 10 via a coin spring (12). The protrusion (10*a*) contacts an outer circumference face of the spiral guide groove 16 on a diameter passing through a rotating center of the disk, and an unshown nut for engaging with a stud bold 6 provided on an engine cover side is attached on the rotating center of the disk (15). A rotation of the disk enables to fix the chain cover (2) and move the guide bar.

4 Claims, 19 Drawing Sheets

AUTO CHAIN TENSIONER

CROSS-REFERENCE TO RELATED APPLICATIONS

This is a Division of application Ser. No. 10/556,762, filed Nov. 15, 2005 as a U.S. national phase application under 35 U.S.C. §371 of International Patent Application No. PCT/JP2004/006847, filed May 20, 2004 and claims the benefit of Japanese Patent Application No. 2003-142398, filed May 20, 2003, the disclosure of which is incorporated herein in its entirety by reference.

FIELD OF THE INVENTION

The present invention relates to an auto chain tensioner providing a tension to a saw chain running along a guide bar by moving the guide bar in a length direction while fixing the guide bar to an engine cover.

BACKGROUND OF THE INVENTION

In a conventional chain tensioner, in order to fix the guide bar by providing the tension to the saw chain running along the guide bar between an engine cover and a chain cover, fixing means for attaching the chain cover to the engine cover and moving means for moving the guide lever frontward in order to provide the tension to the saw chain running along the guide bar are independent, respectively.

A structure of a chain tensioner comprising the fixing means of the guide bar and the moving means is proposed, for example, in Japanese Utility Model Publication No. 3085277. A brief explanation of this structure is provided hereinafter. As shown in FIG. 21, a driving piece 58 convexly provided with plural convex patterns 59 is attached to a guide bar 60 and a spiral orbital row 57 of a catch disk 56 having the spiral orbital row 57 is freely inserted into the convex patterns 59. The moving means of the guide bar 60 manually rotates the catch disk 56 via a driving disk 52 so as to move the guide bar in a tension direction of a saw chain 61.

On the other hand, a nut 53 screwed together with a stud bolt 63 provided in an engine cover 62 is irrotationally housed in a knob 51 disposed on a same axis as that of a driving link 52 via a polygonal seat body 54. In a fixing means of the guide bar 60, the knob 51 is manually rotated so as to fix the guide bar 60 between the engine cover 62 and a chain cover 55 while attaching the chain cover 55 to the engine cover 62.

According to the tensioner of the saw chain proposed by the Japanese Utility Model Publication No. 3085277, it is possible to move the guide bar 60 and fix it between the engine cover 62 and the chain cover 55 without using any tools.

Furthermore, according to Japanese Patent Publication No. 2729582, for example, a suspension device for a tension of the saw chain comprises, as shown in FIG. 22, a disk with the spiral groove 75 and a sliding member 73 having a protrusion (not shown) engaged with a spiral groove 83 of the disk with the spiral groove 75 on one surface, a protrusion 74 engaged with a guide bar 72 on the other surface. A moving mechanism of the guide bar is constructed by engaging a ring-like gear 82 formed in an outer circumference of the disk with the spiral groove 75 with an operation gear 78 supported by the chain cover 76.

The disk with the spiral groove 75 is rotated so that the guide bar 72 is moved in a tension direction of the saw chain 84 via the sliding member 73. On the other hand, a presser disk 79 comprises a metal nut 85 and a folded movable member 80 for pressing and fixing the metal nut 85 by a rotation so as to constitute the fixing mechanism of the guide bar. The folded movable member 80 is raised to rotate the presser disk 79 so that the metal nut 85 is screwed together with a stay bolt 71 attached to the engine cover 70. When the folded movable member 80 is folded, a locking protrusion 81 engages with a tooth row having a plurality of protrusions 77 formed on an inner circumference face of the chain cover 76 so as to restrict a rotation of the presser disk 79 via an operation gear 79.

In these tension/fixing devices for the guide bar disclosed by these publications, the fixing means and moving mechanism are constituted separately. Therefore, it is necessary to carry out the attachment of the guide bar and the chain cover by the fixing means while maintaining a state in which the guide bar is moved by the moving mechanism. Thus, as the case may be, the moving mechanism should be supported by one hand in order not to render the moving mechanism movable, and the fixing means should be rotated only by the other hand. Consequently, it is difficult to provide a tension to the saw chain with a desired tension while fixing the chain cover to the engine cover securely, and each time when providing the tension to the saw chain, an adjustment takes a lot of trouble.

In the present invention, an auto chain tensioner in which a fixing means for fixing a guide bar and a chain cover integrally comprises a moving mechanism for moving a guide bar in a back and forth moving direction is provided. Especially, an auto chain tensioner in which the moving mechanism comprises an adjustment mechanism for adjusting a moving amount of the guide bar and adjusting a tension of a saw chain.

DISCLOSURE OF THE INVENTION

Objects of the invention are achieved by a basic feature of the invention. That is, there is provided an auto chain tensioner for providing a tension to a saw chain running along a guide bar by moving the guide bar, characterized by the chain tensioner comprising chain cover fixing means for pressing and holding the guide bar between an engine case and a chain cover and for fixing the chain cover to the engine case, a slider piece which is disposed between the chain cover and the guide bar or between an engine cover and the guide bar and slides linearly in a back and forth moving direction of the guide bar for providing the tension or a relaxation to the saw chain, and a tensioner which is connected to the slider piece via a spring and is slidable in a sliding direction of the slider piece, wherein the chain cover fixing means further includes a sliding mechanism for allowing one of the slider piece and the tensioner to slide in the back and forth moving direction of the guide bar, and wherein the other one of the tensioner and the slider piece is engaged with the guide bar.

In the invention, the slider piece which linearly slides in the back and forth moving direction of the guide bar and the tensioner, which is connected to the slider piece via the spring and slidable to the same direction as that of the slider piece, are disposed between the chain cover and the guide bar or between the engine cover and the guide bar.

Further, by the sliding mechanism at the chain cover fixing means, one of the slider piece and tensioner is slid in the back and forth moving direction of the guide bar and the other one of the tensioner and slider piece is engaged with the guide bar, so that a sliding of one of the slider piece and the tensioner which slides by the sliding mechanism can move the guide bar in the tension direction of the saw chain by the tensioner or the slider piece connected with the spring.

According to the invention, only by the fixing motion of operating the fixing means, the moving motion of the guide bar for providing the tension to the saw chain can simultaneously carried out and the tension of the chain can be carried out automatically.

In addition, since the slider piece and the tensioner are connected by the spring, the moving amount of the guide bar with respect to the sliding amount by the sliding mechanism can be adjusted depending on the tension of the saw chain and the tension of the saw chain can be finely adjusted.

As the moving mechanism, a moving mechanism carrying out by engaging the spiral groove formed on a face disk with the protrusion formed in the slider piece or the tensioner, a link mechanism able to carrying out the sliding operation of the slider piece or the tensioner carried out at the same time of fixing operation of the chain cover by the rotating operation, and the like can be used.

The slider piece and the tensioner can employ the constitution in which they are disposed so as to be slidable along the guide groove formed in the chain cover, and the constitution in which the slider piece is disposed so as to be slidable along the guide groove formed in the chain cover and the tensioner is disposed so as to be slidable in the slider piece.

As the spring disposed between the slider piece and the tensioner, if the slider piece and the tensioner can carry out a relative movement via a spring force, an appropriate spring such as a coil spring can be used. In addition, the slider piece and the tensioner at respective end portions of the spring can be connected via a screw portion which can adjust a bonding amount or using a conventionally known connecting way for connecting the respective end portions of the spring and between the slider piece and the tensioner.

According to a preferable embodiment of the invention, in addition to the above-mentioned feature, the chain cover fixing means has a rotatable disk screwed together with a stud bolt for guiding the guide bar fixed to an engine case side, and the sliding mechanism forms a spiral guide groove on the disk, the spiral guide groove extending over a prescribed rotation angle, being engaged with a protrusion provided in one of the slider piece and the tensioner, and centers on a rotation center of the disk.

That is, the chain cover fixing means comprises a rotatable disk screwed together with the stud bolt fixed to the engine case, and the spiral guide groove engaged with the protrusion provided on one of the slider piece and the tensioner is formed in the disk. The spiral guide groove fixes the chain cover and the guide bar to the engine cover according to a rotation by screw bonding with a screw rod by the disk. At the same time, the spiral guide groove is rotated by a rotation of the disk, one of the slider piece and the tensioner is linearly slid in the back and forth moving direction of the guide bar via the protrusion engaged with the spiral guide groove, and the guide bar can be moved in a direction to provide a tension or relaxation to the saw chain via the other one of the tensioner and the slider piece.

It is preferable that the protrusion is disposed such that the protrusion moves on a straight line crossing a rotation center of the disk with being pressed by the spiral guide groove and the straight line passing through the rotation center is parallel to a sliding direction of the slider piece or the tensioner.

Consequently, a required tension of the saw chain can be automatically provided by the fixing motion of the chain cover according to the rotation of the disk. In addition, by the rotation of the disk in a dismounting direction of the chain cover, the guide bar can be moved in a relaxing direction of the saw chain.

It is preferable that the spiral guide groove is formed over a prescribed rotation angle such that the guide bar is moved with a prescribed amount by prescribed rotations of the disk. In addition, by providing a spring for biasing the protrusion engaged with the spiral guide groove in the slider piece or the tensioner to the inner circumference side of the spiral guide groove, the slider piece or the tensioner can be securely slid along the inner circumference face of the spiral guide groove.

According to the preferable embodiment of the Invention, in addition to the above-mentioned feature, an outermost circumference or an innermost circumference of the spiral guide groove is formed in an annular groove.

In a case that the annular groove is formed at the outermost circumference of the spiral guide groove, if the disk is rotated prescribed times, the slider piece or the tensioner is slid up to a prescribed amount via the protrusion engaged with the spiral guide groove and further sliding is prevented. At this time, by further rotating the disk, a fixing force of the chain cover with respect to the engine cover is enhanced without sliding the slider piece or the tensioner.

That is, since the movement of the guide bar can be stopped after the guide lever can move up to the position where the protrusion of the slider piece or the tensioner engaged with the spiral guide groove reaches the annular groove existing at the outermost circumference of the spiral guide groove, the tension of the saw chain can be stabilized without sliding the slider piece or the tensioner any more and the fixing force of the chain cover to the engine case can be enhanced even if the disk is further rotated.

Meanwhile, in the above descriptions, it is explained that the slider piece or the tensioner is prevented from being slid more than the prescribed amount and the tension of the saw chain can be stabilized without sliding the slider piece or the tensioner any more. But in a precise sense, if the disk is rotated after the protrusion comes to an outermost circumference end portion of the spiral guide groove, the protrusion can move between outer circumference faces of the spiral guide groove existing at an inner side of the outermost circumference end portion of the spiral guide groove and according to the succeeding rotation of the disk, move along the outer circumference face of the spiral guide groove with being pressed. Consequently, after the protrusion comes to the outermost circumference of the spiral guide groove, the protrusion starts the circle at the outermost circumference of the spiral guide groove and by the rotation of the disk, becomes to reciprocate within a certain range by the outer circumference face of the spiral guide groove since the annular groove is not a perfect circle.

However, since the guide bar is positioned via the spring, the guide bar hardly moves even though the slider piece moves. Therefore, although the strength of the spring force urging to the protrusion engaged with the guide bar or the tensioner changes slightly, the guide bar hardly moves and never interfere with the adjustment of the tension/relaxation of the saw chain.

In the invention, in addition to the above-mentioned feature, there is provided the auto chain tensioner wherein the chain cover comprises an annular concave portion open to an outer surface side of the chain cover, an internal tooth having a smaller diameter than an inner circumference diameter of the concave portion at an edge portion of an edge portion of an opening portion of the concave portion, and a through hole passing through the stud bolt at a center of a bottom face of the concave portion, the disk has a lever which can rise and fall freely and rotates the disk, an external tooth is formed at a part of an outer circumference face of the lever, and the disk passes through the edge portion of the opening portion by a prescribed suppress strength and is rotatably fitted into the concave portion with a play, and the external tooth of the lever and the internal tooth of the opening are engaged with each other when the lever falls on a disk surface side.

In this embodiment, the disk is rotatably fitted into the concave portion formed in the chain cover with a play and the slipping out of the disk is prevented by the edge portion of the opening portion, so that the dropping out of the disk from the chain cover is prevented. In addition, the external tooth formed in the outer circumference portion of the lever attached to the disk and the internal tooth formed in the edge portion of the opening portion of the concave portion are engaged with each other, the disk can be fixed at the prescribed rotation position. By rotating the disk in the fastening direction between the disk and the stud bolt fixed to the engine cover side, the fixing of the chain cover to the engine cover and the fixing of the guide bar can be carried out.

As the internal tooth formed in the edge portion of the opening portion and the external tooth formed in the lever, the terms of "internal tooth" and "external tooth" are mentioned, but the members formed from the shape of plural protruding portions and concave portions receiving the protruding portions, other than the tooth having a shape such as an in-volt curve, are included as the meaning of the terms of the internal tooth and external tooth used in the invention of the application.

In the invention, in addition to the above-mentioned feature, a detent mechanism is provided between the disk and the lever, the detent mechanism able to fix a rising/falling angle of the lever at plural angular positions.

In the invention, the conventionally known detent mechanism is disposed between the lever and the disk and the lever can be held by itself at the plural angle positions in which the lever rises or falls.

Thus, upon fixing the chain cover, the lever can be fixed at the angle position not interfering with the rotation of the disk, and the lever can be fixed at the angle position in which it is easy to increase the fastening strength for fixing the chain cover.

As the detent mechanism, the protrusion is formed on the disk face which faces off against the rotation portion of the lever and the concave portion for receiving the protrusion on the disk face is formed in a rotation portion side of the lever at plural angle positions, so that the detent mechanism can be constituted by the engagement of the concave portion of the lever and the protrusion on the disk face. Alternatively, it is possible that the protrusion is formed in the rotation portion side of the lever and the concave portion is formed on the disk face. Further, instead of the concave portion, plural protrusion engaged with the other protrusions can be provided so as to be spaced each other in the rotating direction of the lever, and they can be engaged with the other protrusions between the plural protrusions.

Meanwhile, as the constitution of the detent mechanism, other than the above-mentioned constitution, the detent mechanism can be constituted between the support face of the support portion supporting the lever rotatably and the end face of the lever, or can be constituted by using a round body instead of the protrusion. That is, the conventionally known detent mechanism can be employed as the detent mechanism in the invention of the application.

In the invention, in addition to the above-mentioned feature, a support axis supporting the lever so as to allow the lever to raise and fall freely is disposed at a part away from a rotation centerline of the disk without intersecting with the rotation centerline of the disk.

In the invention, the support axis supporting the lever rotatably is not disposed on the rotation centerline of the disk, so that the lever can be operated at the position separated from the rotation center of the disk in the diameter direction. Therefore, upon fixing the chain cover by rotating the disk, the lever rises or falls, so that the rotation torque necessary for rotating the disk can be obtained by operating the lever with less force.

That is, the rotation torque can be obtained by the product of the interval from the rotation center of the disk to the position where the lever is operated and the force for operating the lever at the same position, so that the lever can be operated with less force and the disk can be rotated, if the interval from the rotation center of the disk to the position where the lever is operated is longer.

Therefore, if a worker does not have so much power, the chain cover can be fixed securely and a workload of the worker can be reduced.

In the invention, in addition to the above-mentioned feature, there is provided the auto chain tensioner wherein the chain cover fixing means has a link mechanism, and the link mechanism comprises a fixing link mechanism which presses and holds the guide bar between the engine case and the chain cover by an engagement with a fixing member fixed to an engine case side, and fixes the chain cover to the engine case, and a sliding link mechanism which slides one of the slider piece and the tensioner in the back and forth moving direction of the guide bar.

In the invention, in the constitution that the chain cover is fixed to the engine cover using the link mechanism, one of the slider piece and the tensioner is slid in the back and forth moving direction of the guide bar using the link mechanism, and in the fixing means of the chain cover using the link mechanism, the fixing operation of the chain cover and the sliding operation for sliding the slider piece or the tensioner can be carried out continuously.

Furthermore, in the invention, in addition to the above-mentioned feature, a spring connecting the slider piece and the tensioner is a coil spring, one end of the coil spring is fixed to the tensioner, and the other end of the coil spring is screwed together with a screw portion disposed at the slider piece directly or via a screw portion attached to an end of the coil spring.

In the invention, the attachment constitution between the end portion of the coil spring connecting the slider piece and the tensioner and the slider piece and the tensioner is restricted. Specifically, the attachment constitution between the coil spring and slider piece can be restricted to the constitution wherein the screw portion disposed in the slider piece and the coil spring are directly screwed together or the constitution wherein the screw portion disposed in the slider piece and the screw portion attached to the coil spring are screwed to together.

As the screw portion disposed in the slider piece, the male screw portion or the female screw portion can be used. When the male screw portion is used as the screw portion disposed in the slider piece, the inner circumference side of the coil spring can be attached directly to the male screw portion so as to be screwed together therewith, or alternatively, the female screw portion can be used as the screw portion attached to the coil spring.

Alternatively, when the female screw portion is used as the screw portion disposed in the slider piece, the outer circumference side of the coil spring can be attached directly to the screw portion of the female screw portion so as to be screwed together therewith, or alternatively, the male screw portion can be used as the screw portion attached to the coil spring With this constitution, the screw amount between the coil spring and the slider piece can be adjusted.

In the invention, in addition to the above-mentioned feature, the slider piece and the tensioner are guided into the chain cover irrotationally but slidably, and the screw portion disposed at the slider piece is supported to the slider piece rotatably and disposed such that rotating operation is possible from an outside.

In the invention, the slider piece and the tensioner are guided into the chain cover irrotationally, so that the screw portion disposed in the slider piece is rotated by the external operation and the screw amount between the screw portion and the coil spring can be adjusted by the operation from the outside. With the constitution, a fine adjustment of the moving amount of the guide bar can be carried out by adjusting the screw amount between the screw portion of the slider piece and the coil spring, and the tension of the fine adjustment of the saw chain is possible until just before the guide bar is pressed and held.

In the invention, in addition to the above-mentioned feature, at least one of screw heads, i.e., a screw head at a screwing portion of the screw portion disposed at the slider piece and the coil spring, a screw head at a screwing portion of the screw portion disposed at the slider piece and the screw portion attached to the end of the coil spring, and a screw head at a screwing portion of the coil spring and the screw portion attached to the end of the coil spring, is formed into such a shape that the other member screwed together with the screw head by a spring force added to the coil spring more than the prescribed strength overleaps the screw head.

In the invention, when the spring force more than the prescribed value is applied to the coil spring, the spring force should not become more than the prescribed value between the end portion of the coil spring and the screw portion of the slider piece. Therefore, it is a character of the invention that a shape of a screw head at the screw portion of the slider piece, a shape of at least one of the screw heads at the screwing portion with the screw portion attached to the coil spring screwed with said screw head, or a shape of the screw head of the screw portion attached to the coil spring is formed to the shape with which the screw head can be overleaped by the slip of the screwing when a stronger-than-prescribed spring force is applied to the coil spring.

With the constitution, the stronger-than-prescribed spring force does not occur in the coil spring, so that the tension of the saw chain carried out via the movement of the guide bar can be suppressed within the prescribed tension restricted by the spring force of the coil spring. Thus, even if the screw portion disposed at the slider piece is twisted so as to enlarge the screwing amount with the coil spring and the spring force is increased, the spring force more than the spring force restricted by the shape of the screw head at the screw portion of the slider piece does not occur in the coil spring and the tension of the saw chain can be adjusted securely.

The shape with which the screw head can be overleaped can be formed in the screw head of the screw portion of the slider piece, the screw head of the screw portion attached to the coil spring, or the screw head formed in the coil spring screwing portion of the screw portion attached to the coil spring. Alternatively, it can be formed in all of these screw heads.

In addition, by adding other member to the engagement portion with the screw portion attached to the coil spring without forming the screw head into a special shape, the spring force can be reduced when the stronger-than-prescribed spring force is applied to the coil spring.

Furthermore, in the invention, in addition to the above-mentioned feature, the slider piece or the tensioner comprises an engagement protrusion for being engaged with the guide bar, a pawl in a ratchet mechanism is formed at a front end portion of the engagement protrusion, a pawl receiving member for being engaged with the pawl in the ratchet mechanism is disposed in the engine case, and the pawl receiving member is urged to a side of the engagement protrusion.

In this invention, a ratchet mechanism is constituted by the pawl formed at the front end portion of the engagement protrusion of the slider piece or the tensioner, and by the pawl receiving member disposed in the engine case. Further, the pawl receiving member is resiliently urged toward a side of the pawl formed at the front end portion of the engagement protrusion.

With the constitution, the sliding position of the engagement protrusion of the slider piece or the tensioner which slides by the moving mechanism of the fixing means does not go back by the engagement with the pawl receiving member, and the sliding position of the engagement protrusion can be maintained at any time. Therefore, the going back can be prevented while at work of the saw chain by the guide bar, and the work can be carried out with always maintaining the prescribed tension condition of the saw chain.

Furthermore, in the invention, in addition to the above-mentioned feature, a contact face of the engine case which contacts with the guide bar and/or a contact face of the chain cover is formed such that a friction coefficient at the contact face is increasing.

In the invention, the friction coefficient at the contact face is increased by sticking a member having a large friction coefficient on the contact face of the engine case which contacts with the guide bar and/or the contact face of the chain cover, or for example, by forming the contact face of the uneven shape using an emery cloth.

With this constitution, the movement of the guide bar in a working state of the saw chain is prevented and the work by the chain saw can be carried out securely. Further, friction coefficient at the contact face is increased, so that the desired pressing and holding force can be obtained with the small fastening force by the fixing means. Therefore, for example, when the rotation disk is used as the fixing means, the guide bar can be fastened and fixed in a state that the number of rotations is less, so that the protruding amount of the chain cover can be reduced.

Alternatively, according to the invention, in addition to the above-mentioned feature, it is possible to provide a wedge face on a contact face of the guide bar that contacts with the engine case and/or on a contact face that contacts with the chain cover.

In the invention, with the wedge face on a guide bar side, a fastening and fixing of the guide bar is enhanced.

As to features except that the wedge face is provided on the contact face of the guide bar that contacts with the engine case and/or on the contact face that contacts with the chain cover, it is possible to use a standard product available in a market as it is. However, as to the guide bar on which the wedge face is formed, a special guide bar is required. By using the special guide bar, the fastening and fixing of the guide bar is enhanced.

Furthermore, according to the invention in addition to the above-mentioned feature, it is possible to further provide one or more fixing portion of the chain cover at the engine cover for fixing the chain cover at plural portions in conjunction with operation of a fixing member of the chain cover.

When the fixing member of the chain cover is, for example, rotated, a nut provided on the fixing member of the chain cover screws together with the stud bolt fixed to the engine cover and fastens it while one or more fixing portion of the chain cover is rotated via a transmission member attached to the engine cover such as a gear or a belt and fastened by the nut fixed to the engine cover or the like. As a result, the chain cover is securely pressed and fixed at the plural portions at a same time together with the guide bar. That is, by simply operating the fixing member of the chain cover, plural fixing means work in conjunction so as to more securely fix the chain cover and the guide bar to the engine cover.

Furthermore, according to the invention in addition to the above-mentioned feature, it is possible to provide temporary fixing means for temporarily fixing the guide bar to the engine cover in such a manner that the contact face of the guide bar is in parallel with the contact face of the engine cover.

With the temporary fixing means, it is prevented that a fixing face of the guide bar inclines in a separating direction from a fixing face of the engine cover when the chain is mounted in a groove formed along a circumference face of the guide bar. As a result, the mounting of the chain to the guide bar Is facilitated, which makes it possible for a person who is not familiar with operation of the chain saw to easily and securely mount the chain to the guide bar.

BEST MODE FOR IMPLEMENTING THE INVENTION

Hereinafter, preferred embodiments are described in detail with reference to accompanying drawings. However, the invention is not limited to the following preferred embodiments, but naturally includes technical area that a person skilled in the art can easily adopt.

Figure 1:
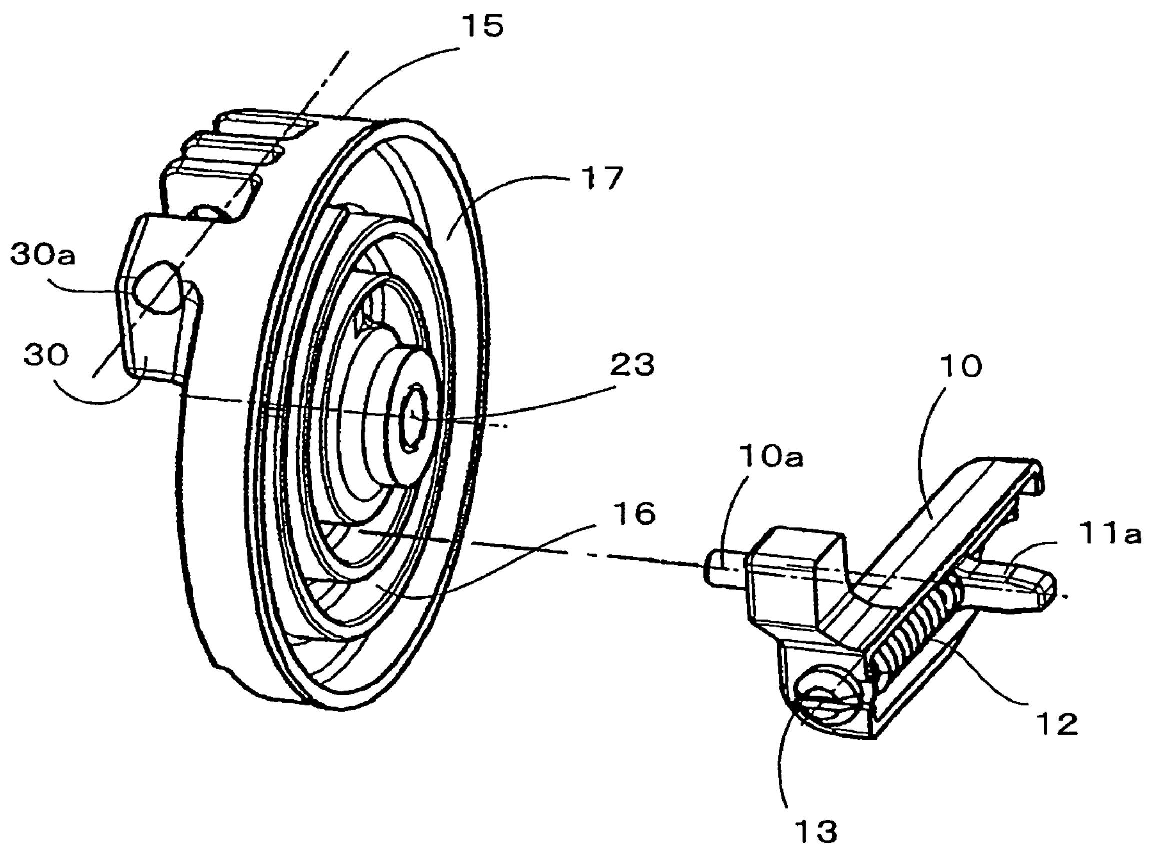
FIG. 1 is a disassembled perspective view of an auto chain tensioner according to a first embodiment of the invention.
Figure 2:
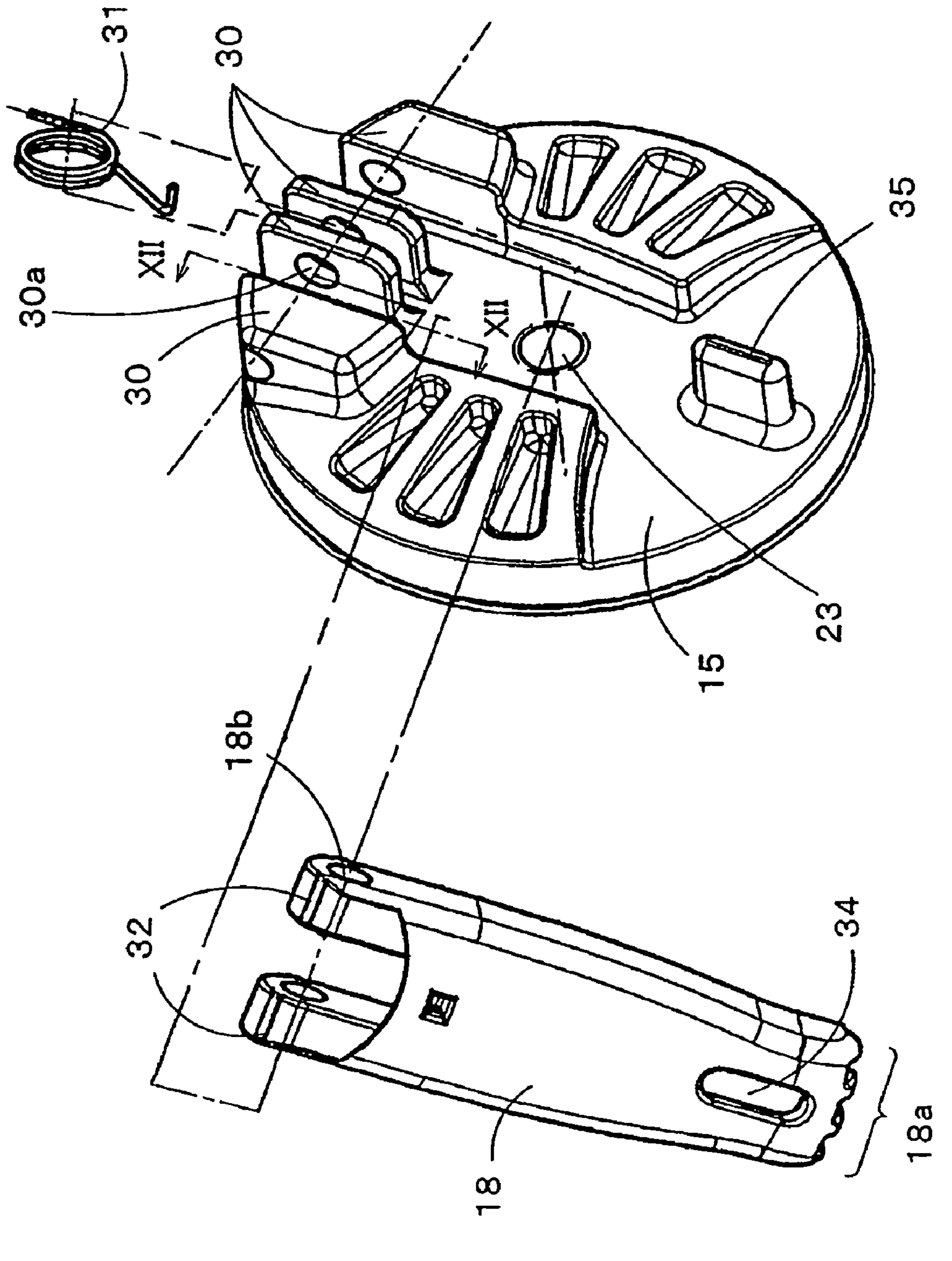
FIG. 2 is a disassembled perspective view showing a relation between a disk and a lever.

FIG. 1 is a perspective view seen from a rear side of a disk 15 after disassembling fixing means comprising the disk 15, a slider piece 10 and a tensioner 11 according to a first embodiment of the invention. FIG. 2 is a perspective view seen from a front side of the disk 15 after disassembling the disk 15 and a lever 18. In FIG. 1, the lever 18 is omitted.

Figure 3:
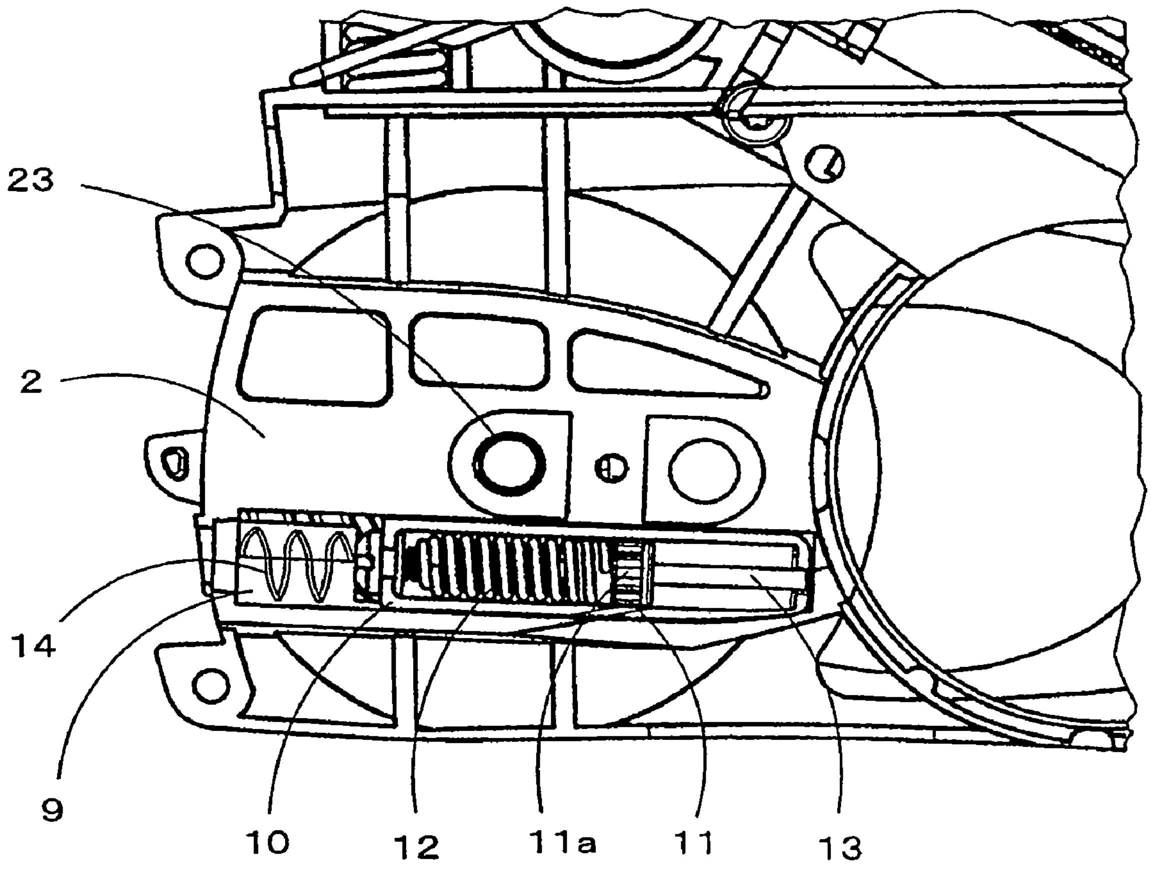
FIG. 3 is a partial plan view of a chain cover seen from a rear side thereof.
Figure 4:
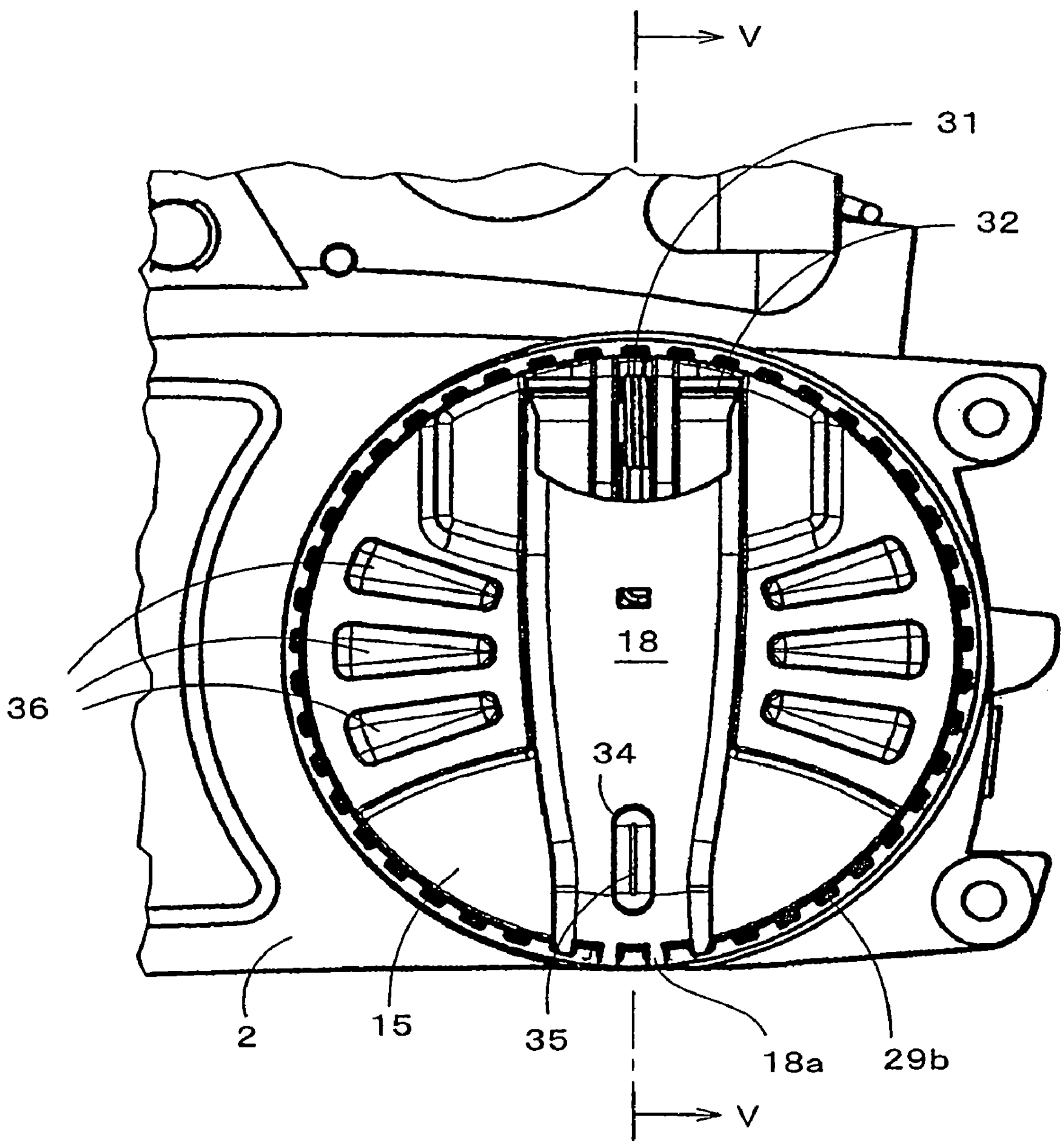
FIG. 4 is a partial plan view of the chain cover seen from a front side thereof.
Figure 5:
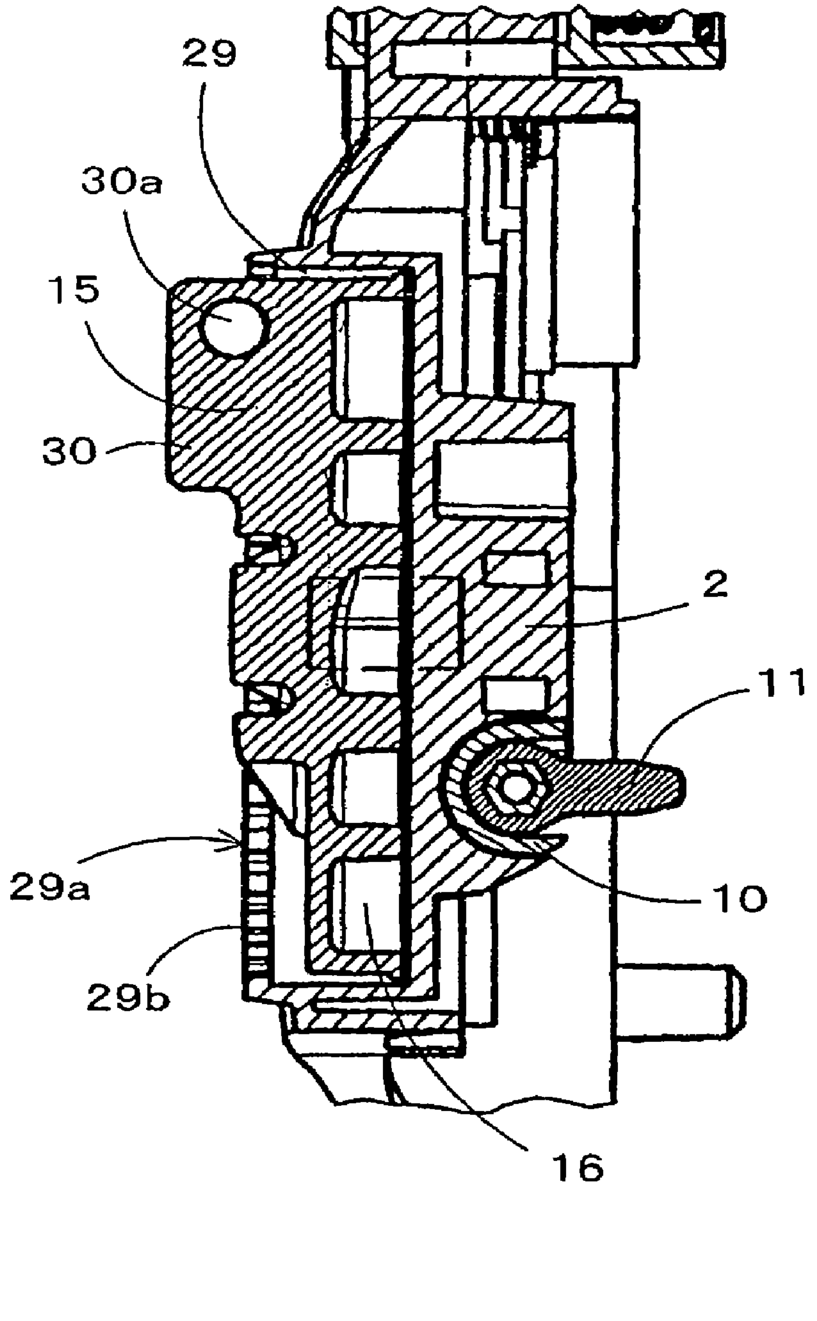
FIG. 5 is a part of a sectional view taken along a line V-V in FIG. 4.
Figure 6:
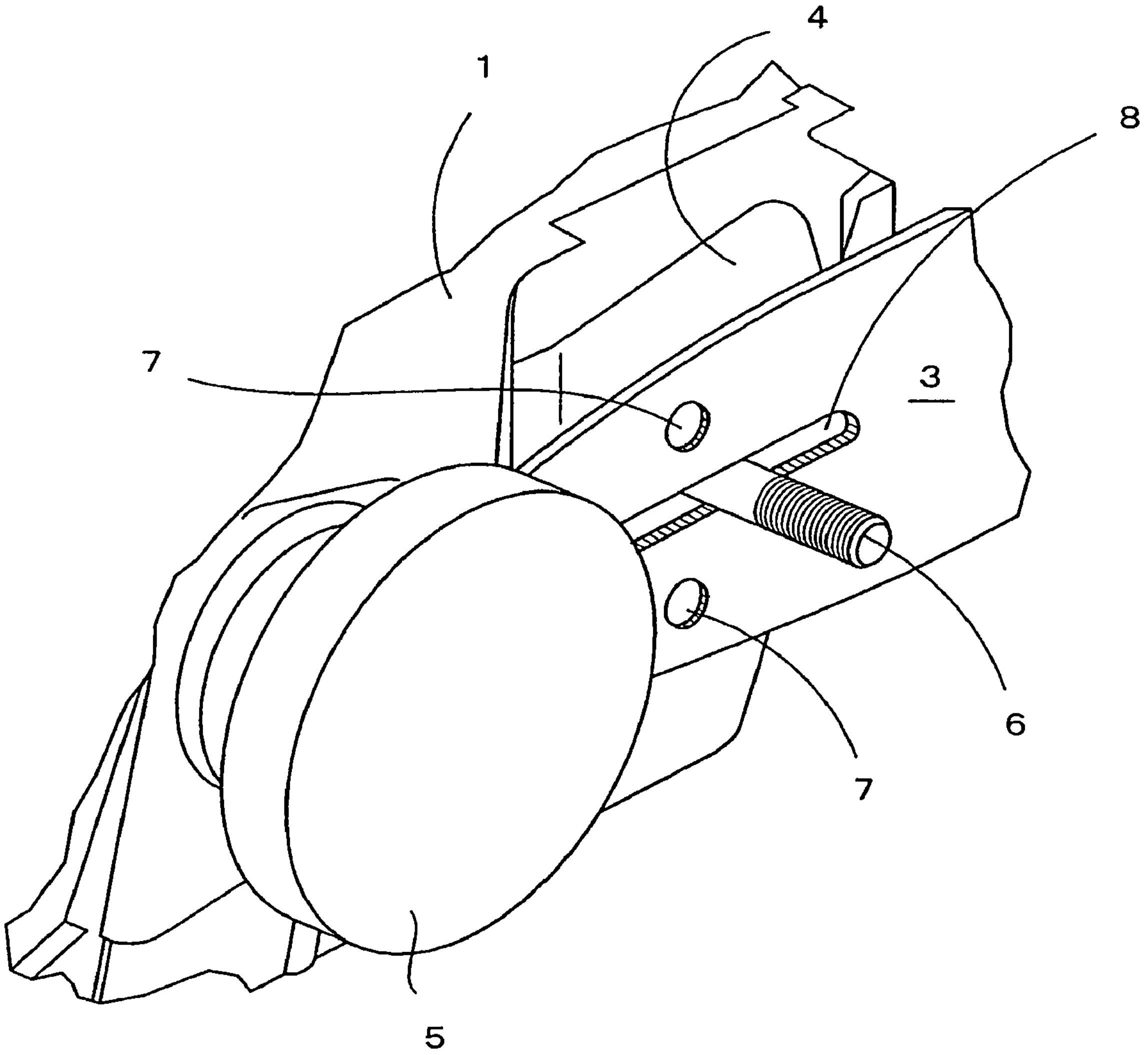
FIG. 6 is a partial perspective view on an engine cover side when the chain cover is removed.

FIG. 3 is a plan view showing a slider piece 10 and tensioner 11 on a rear side of a chain cover 2. FIG. 4 shows the disk 15 and the lever 18 of the fixing means on a front side of the chain cover 2 and FIG. 5 shows a part of a sectional view taken along a line V-V in FIG. 4 without the lever 18. FIG. 6 is an outline view of a major portion of an engine cover 1 without the chain cover 2.

As shown in FIG. 6, a moving direction of a guide bar 3 is restricted by inserting a stud bolt 6 fixed in the engine cover 1 and an unshown guide pin into a guide slit 8 formed in the guide bar 3. Tension can be provided to a saw chain by hanging an unshown saw chain around a guide groove formed in a circumference of a clutch having a driving pulley and the guide bar 3 and moving the guide bar 3 in a right direction in FIG. 6. Further, the guide bar 3 and the unshown chain cover 2 can be fixed on a side of the engine cover 1 by pressing the unshown chain cover 2 from a front side in FIG. 6 toward the engine cover 1 by the fixing means that screws together with the stud bolt 6 so as to fix the chain cover 2.

At this time, it is possible to secure a pressing and a holding by adhering material having a high friction coefficient on a surface of a guide plate 4 provided on the engine cover 1 or a contact face of the unshown chain cover 2 with respect to the guide bar 3. Further, it is possible to form a concave and convex portions on the front surface of the guide plate 4 or the contact face on the chain cover 2 with respect to the guide bar 3 so that the friction coefficient increases.

Alternatively, although it is not illustrated, it is possible to form a wedge face on a surface of the guide bar 3 so that the friction coefficient increases with respect to the surface of the guide plate 4 or the contact face with the guide bar 3 of the unshown chain cover 2. The wedge face can be formed on one side or both sides of the guide bar 3. Further, it is possible to form a wedge face that works in cooperation with the wedge face on the guide bar 3 on the surface of the guide plate 4 facing the wedge face on the guide bar 3 or the contact face with the guide bar 3 of the chain cover 2.

Figure 7:
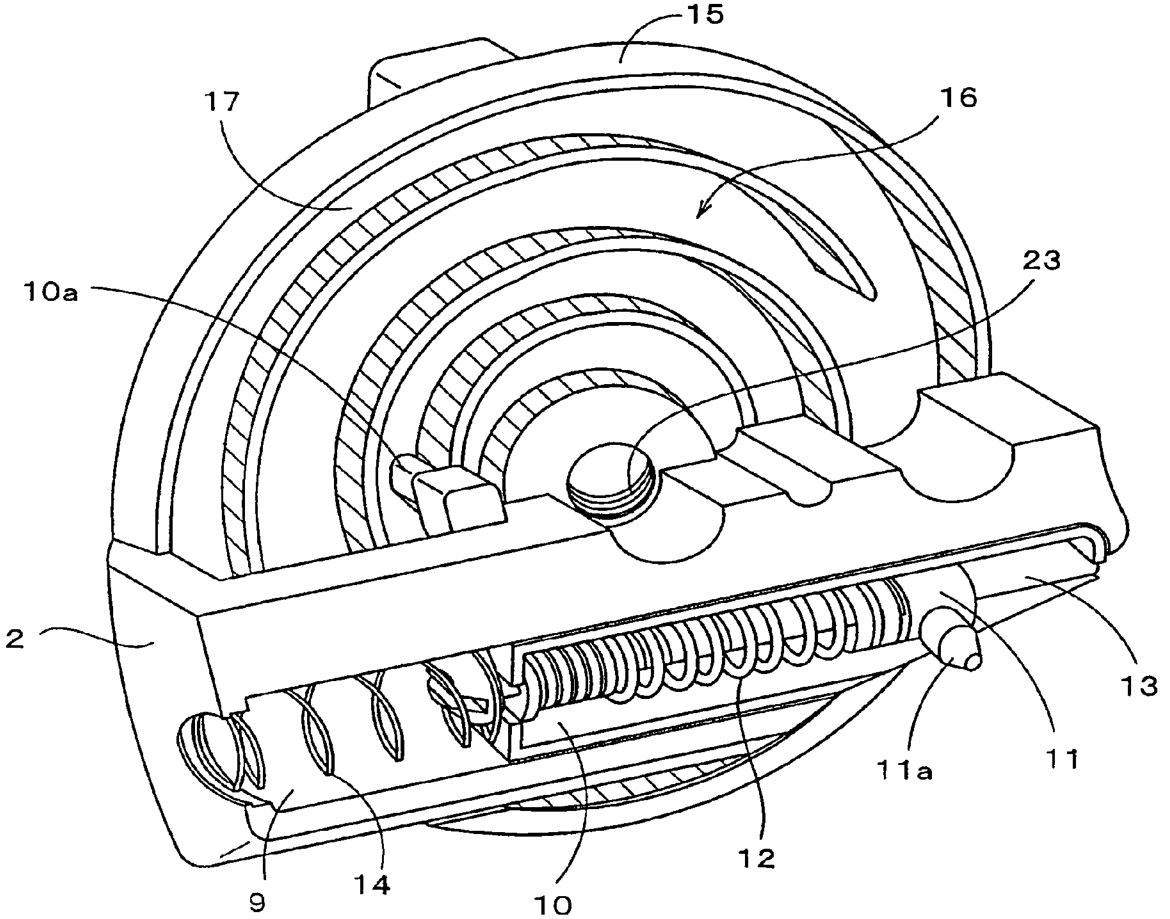
FIG. 7 is a partial perspective view of an assembly of the auto chain tensioner according to this embodiment.

With reference to FIGS. 7 to 11, a construction of an auto chain tensioner with the fixing means is described. FIG. 7 shows a state in which a spiral guide groove 16 formed on the rear surface of the disk 15 and a protrusion 10*a* formed in a slider piece 10 engage with each other and the slider piece 10 is slidably stored in a guide portion 9 formed in the chain cover Between the slider piece 10 and the chain cover 2, a spring 14 for urging the slider piece 10 in a right direction in FIG. 7 that is an initial position thereof is provided. Due to the spring 14, the protrusion 10*a* contacts an outer circumference face of the spiral guide groove 16. Further, a contact point of the protrusion 10*a* and the outer circumference face of the spiral guide groove 16 is disposed such that they contact each other on a diameter passing through a rotating center of the disk 15 and thus, the protrusion 10*a* moves on the diameter according to a rotation of the disk 15. The outer circumference face of the spiral guide groove 16 means an outer wall face of one of a pair of spiral walls forming the guide groove 16, the one of the pair of the spiral walls being disposed inside of the other one of the spiral walls.

Further, a nut 23 which screws together with the stud bolt 6 (see FIG. 6) is attached in a center of the rotating center of the disk 15 for fixing the chain cover 2 to the engine cover 1 according to the rotation of the disk 15 while pressing and holding the guide bar 3 with respect to the guide plate 4 as shown in FIG. 6.

In the FIG. 7, according to the rotation of the disk 15 in a clockwise direction, the protrusion 10*a* in contact with the outer circumference face of the spiral guide groove 16 moves in a left direction in the same drawing. According to a movement of the protrusion 10*a*, the slider piece 10 slides in the left direction in the guide portion 9. The tensioner 11 is pulled via a coil spring 12 and also slides in the left direction in the slider piece 10. According to a slide of the tensioner 11, the guide bar 3 engaging with the protrusion 11*a* also moves in the left direction. It is possible to provide a strong tension to the saw chain by the movement of the guide bar 3 in the left direction.

If the protrusion 10*a* is further moved in the left direction by the spiral guide groove 16 after the saw chain is pulled by a prescribed tension, the protrusion 10*a* is allowed to move due to an extension of the coil spring 12. After the protrusion 10*a* reaches a side of an outermost circumference groove 17 formed in an annular shape, even if the disk 15 rotates, a force in right and left directions with respect to the guide bar 3 by the coil sprig 12 only decreases slightly and a position of the guide bar 3 barely changes although the protrusion 10*a* may slightly moves in right and left directions in FIG. 7 due to the outer circumference face of the spiral guide groove facing the outermost circumference groove. Therefore, the protrusion 10*a* maintains the position.

As a result, the protrusion 10*a* is restricted to move beyond a prescribed distance by the outermost circumference groove 17. After the protrusion 10*a* reaches the outermost circumference groove 17, the rotation of the disk is used for fixing the chain cover 2 to the engine cover 1 and fixing and holding the guide bar 3.

The tensioner 11 is connected to a slider via the coil spring 12 and disposed so as to slide in the slider piece in a sliding direction of the slider piece 10. An arrangement between the slider piece 10 and the tensioner 11 is further described with reference to FIGS. 8 and 9.

Figure 8:
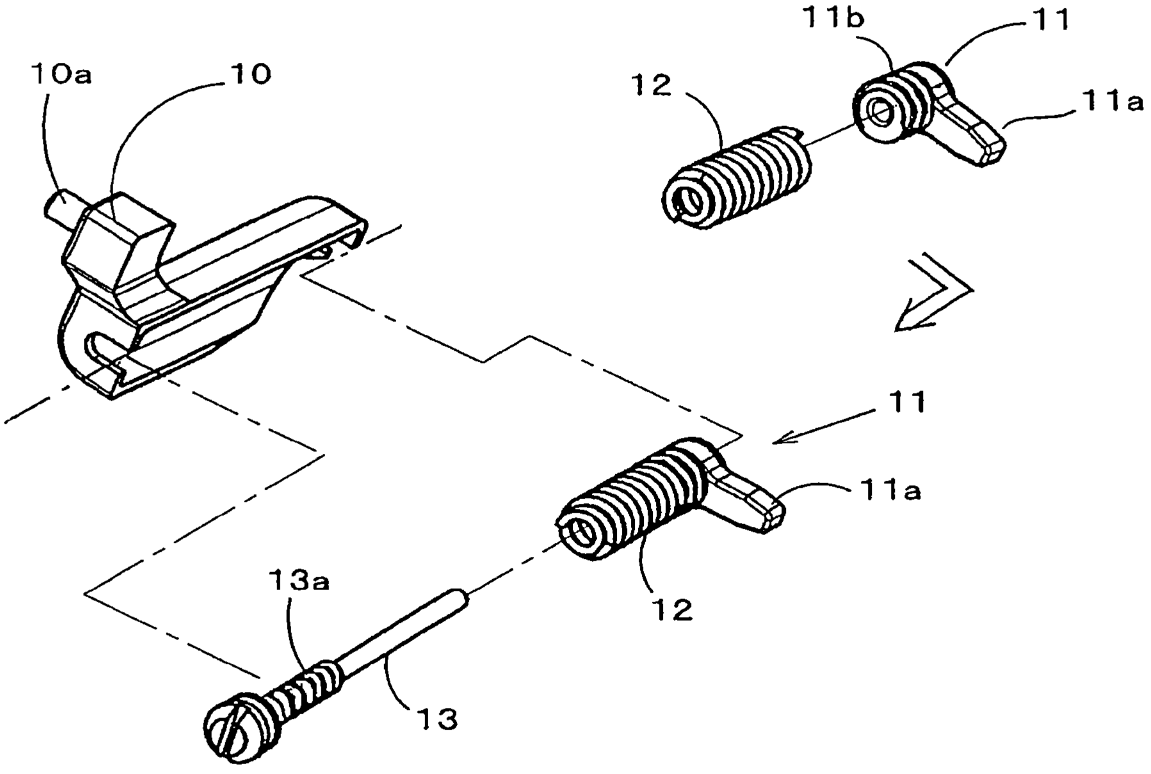
FIG. 8 is a disassembled perspective view of a slider piece and the tensioner according to this embodiment.
Figure 9:
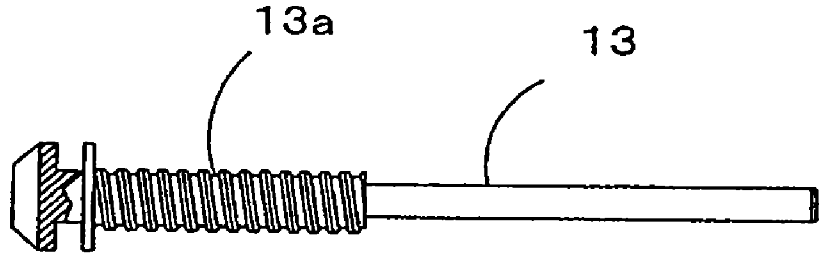
FIG. 9 is a plan view of a guide pin with a screw.

As shown in FIG. 8, the slider piece 10 is formed in a case-like shape with one side open having the protrusion 10*a*. The tensioner 11 comprises a protrusion 11*a* and a screwed portion 11*b* screwed together with the coil spring 12. The protrusion 11*a* and the screwed portion 11*b* can be formed integrally, or they can be separately formed and connected and fixed together afterwards. Further, it is possible to fix the coil spring 12 to the tensioner by any appropriate means without providing the screwed portion 11*b*. As for a shape of the protrusion 11*a*, any shapes can be adopted as long as it can engage in a hole 7 (see FIG. 6) of the guide bar 3.

The tensioner 11 and the coil spring 12 have internal diameters which allow an insertion of a guide pin with a screw 13 rotatably supported with respect to the slider piece 10. An end portion of the coil spring 12 screws together with a screw portion 13*a* of a guide pin with a screw 13 and is stored in the slider piece 10. A groove is formed in a head portion of the guide pin with the screw 13 so that the guide pin with the screw 13 can be rotated with a driver or the like inserted through a hole formed in the chain cover 2 as shown in FIG. 7.

Further, the screw portion 13*a* and the coil spring 12 can be screwed together via another member or they can be connected by integrally forming the coil spring 12 with the another member. Any shapes of the screw portion 13*a* and the coil sprig 12 can be adopted as long as they can screw together.

A gap is formed between the head portion of the guide pin with the screw 13 and a flange portion of a washer or the like disposed on a side of the screw potion 13*a*, and the gap is inserted into a concave portion formed in an end portion of the slider piece 10.

Figure 10:
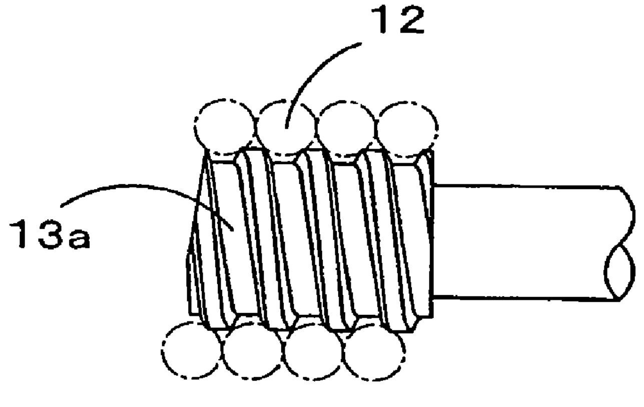
FIG. 10 is a partially enlarged view of the guide pin with the screw according to this embodiment.
Figure 11:
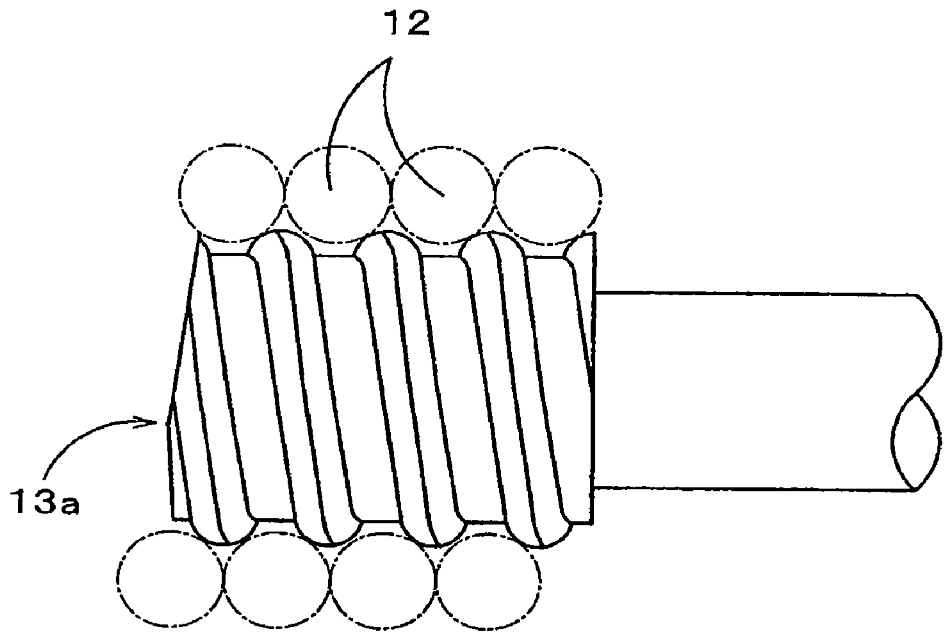
FIG. 11 is a partially enlarged view of another guide pin with a screw.

FIG. 10 illustrates a construction in which the coil spring 12 directly screws together with the guide pin with the screw 13. However, it is possible to attach a screw portion of a nut or the like to the coil spring 12 so that the screw portion screws together with the guide pin with the screw 13. Alternatively, it is possible to adopt a construction in which a female screw portion of a nut or the like, instead of the guide pin with the screw 13, is rotatably supported with respect to the slider piece 10 and screws together with a circumference portion of the coil spring 12. Also, it is possible to adopt a construction in which a male screw portion is attached to the coil spring 12 so as to screw together with the female screw potion rotatably supported with respect to the slider piece 10.

Alternatively, it is possible to adopt a construction in which a screw head of the guide pin with the screw 13 is formed in a round shape so that coil spring 12 goes over the screw head of the guide pin with the screw 13, thereby decreasing a spring force, if the coil spring 12 is pulled with the spring force exceeding a prescribed force. With this construction, the spring force of the coil spring 12 can be always maintained smaller than a certain spring force.

As a shape of the screw head of the screw besides the round shape, any shape can be adopted as long as it allows the coil spring 12 to overleap the screw head by a stronger-than-prescribed spring force. Furthermore, besides the coil spring screwed together with the screw head of the screw, it is possible to adopt a shape that allows the aforementioned screw portion attached to the coil spring to overleap. Further, it is possible to form a screw head of the screw portion attached to the coil spring 12 in a shape allowing the screw portion provided on a side of the slider piece 10 such as the guide pin with the screw 13 to overleap the screw head and it is also possible to form a screw head of the screw portion attached to the coil spring 12 on a screwing side with the coil spring 12 in a shape allowing the coil spring 12 to overleap the screw head.

Further, the screw portion 13*a* and the coil spring 12 can be screwed together via another member or they can be connected by integrally forming the coil spring 12 with the another member. Any shapes of the screw portion 13*a* and the coil sprig 12 can be adopted as long as they can screw together.

Figure 17:
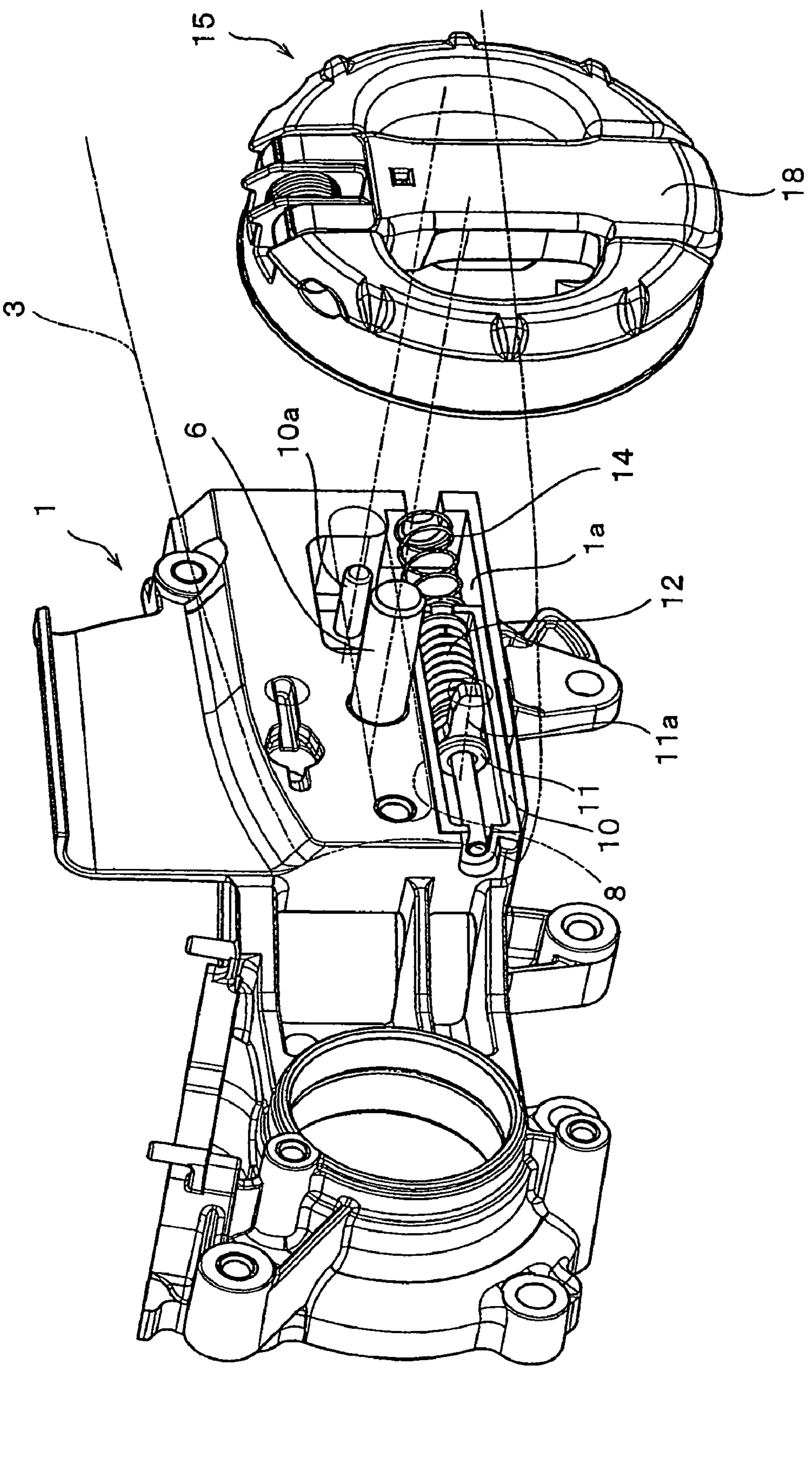
FIG. 17 is an explanatory view of a structure in which a tensioner is mounted on a side of an engine cover in another modified example of the above first embodiment.

In the above-mentioned explanation, although an embodiment wherein the tensioner 11 is disposed in the slider piece 10 is described, it is possible, for example, to adopt a construction in which the slider piece and the tensioner are independently disposed and connected via a spring in the guide portion 9 shown in FIG. 17. In this case, it is preferable that the slider piece and the tensioner are constructed so as not to rotate when the screw portion disposed in the slider piece is rotated by external operation.

The protrusion 10*a* of the slider piece 10 which stores the tensioner 11 is inserted into the spiral guide groove 16 formed in the disk 15 as shown in FIG. 1. An unshown elongated hole open to a side of the disk 15 is formed in the guide portion 19 of the chain cover 2 in FIG. 7 and the protrusion 10*a* is inserted into the spiral guide groove 16 of the disk 15 through the elongated hole. Furthermore, the protrusion 11*a* of the tensioner 11 engages with the hole 7 (see FIG. 6) of the guide bar 3 by mounting the chain cover 2 on the engine cover 1.

Although the protrusion inserted into the spiral guide groove 16 of the disk 15 is constructed as the protrusion formed in the slider piece 10 in this embodiment, a construction in which the protrusion 11*a* in the tensioner 11 is inserted into the spiral guide groove 16 may be adopted. In this case, it is necessary that the protrusion 11*a* of the tensioner 11 is constructed so as to contact the spiral guide groove 16 on the diameter passing through the rotating center of the disk 15. Also, it is necessary that the protrusion 10*a* of the slider piece 10 is constructed so as to engage with the hole 7 (see FIG. 6) of the guide bar 3 when the chain cover 2 is mounted on the engine cover 1.

Hereinafter, an attachment of the disk 15 to an inside of the chain cover 2 is described with reference to FIGS. 2, 4 and 5. As shown in FIG. 4 showing a plan view seen from a front side of the chain cover 2 and FIG. 5 showing a sectional view taken along a line V-V in FIG. 4, the disk 15 is stored in an annular concave portion 29. An internal diameter of an internal tooth 29*b* formed at an edge portion of an opening portion 29*a* of the chain cover 2 is formed slightly smaller than a contour of the disk 15 and an internal diameter of the concave portion 29 is formed slightly larger than the contour of the disk 15.

Therefore, by pressing the disk 15 into the opening portion 29*a*, the disk 15 is prevented from dropping out of the concave portion 29 and able to rotate so as to slide in the concave portion 29.

As shown in FIG. 2, flange portions 30 are provided on an outer surface on the disk 15 so as to protrude for rotatably supporting a lever. The lever 18 is rotatably attached via a rotation axis 19 (see FIG. 13) provided between rotation holes 18*b* formed in the lever 18 and axis supporting holes 30*a* formed in the flange portions 30 working as supporting portions.

Figure 13:
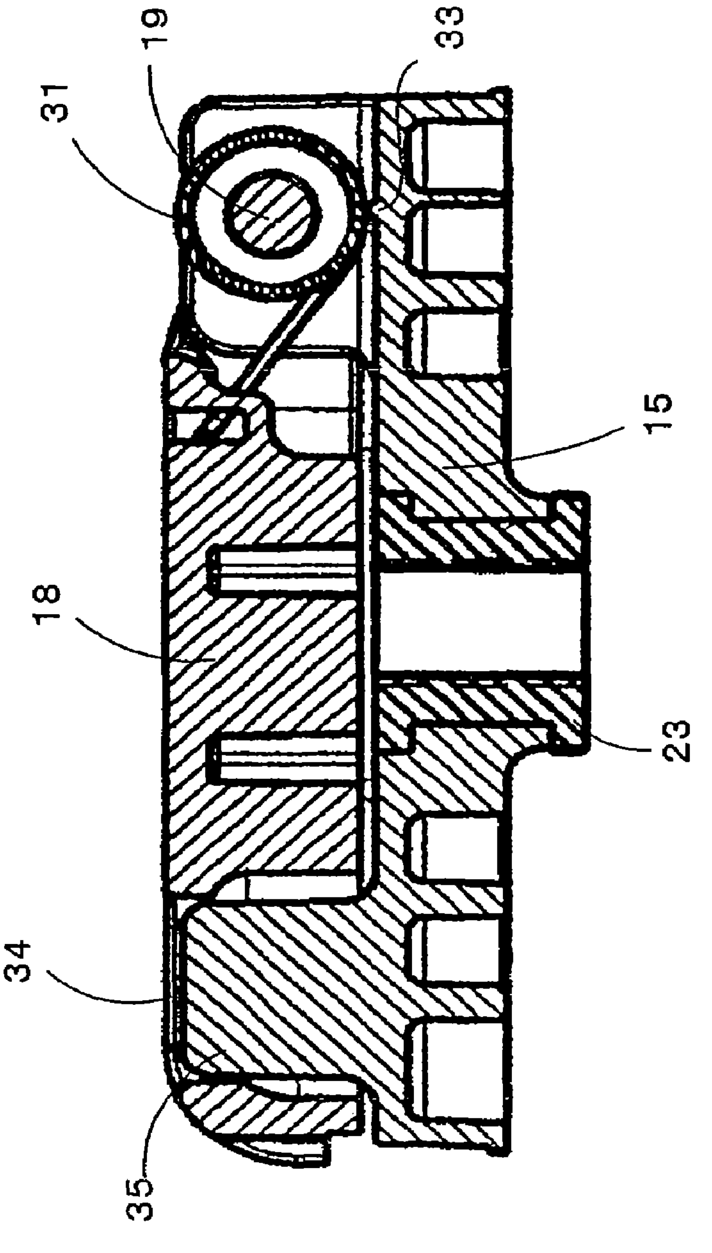
FIG. 13 is a sectional view of an assembly of the disk and the lever according to this embodiment.

FIG. 13 shows a sectional view of the disk 15 and the lever 18. As shown in these drawings, the lever 18 is urged toward a disk surface side so as to be laid down by a spring 31 disposed between the flange portions 30. The spring and the rotation holes 18*b* of the lever 18 are supported with respect to the flange portions 30 by the rotation axis 19. Further, the nut 23 to be screwed together with the stud bolt 6 (see FIG. 6) is disposed in a rotating center of the disk 15 so as not to rotate with respect to the disk 15.

Figure 12:
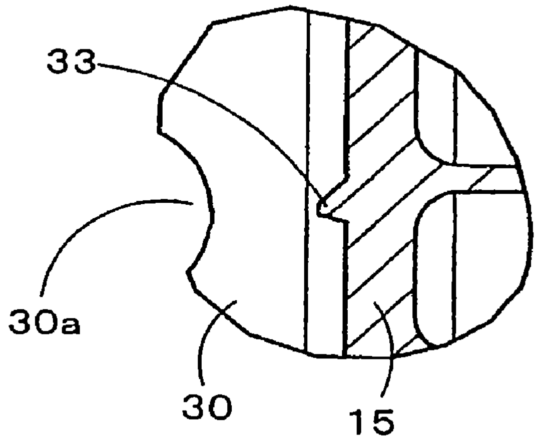
FIG. 12 is a part of a sectional view taken along a line XII-XII in FIG. 2.

At a prescribed angle position of a rotating portion of the lever 18, a plurality of protruding portions 32 are formed and engage with protruding portions 33 on the disk 15 at an every prescribed angle as shown in FIG. 12 showing a part of a sectional view taken along a line XII-XII in FIG. 2 so as to form a detent mechanism. The detent mechanism is not limited to the aforementioned construction, but any other well-known mechanism can be adopted as the detent mechanism. For example, it is possible to form it in rotational contact faces between a flange portion 30 and an end portion of the lever 18 or to use an elastically urged sphere capable of appearing and disappearing freely instead of the protruding portions 33.

As shown in FIG. 2, there is provided a protruding portion 35 that goes through a through hole 34 formed in the disk when the lever 18 is laid down. Further, an external tooth 18*a* is formed on an front end portion which is a part of an outer circumference portion of the lever 18 and the external tooth 18*a* engages with the internal tooth 29*b* formed at the opening portion 29*a* of the chain cover 2 when the lever is laid down as shown in FIG. 4, which restricts the rotation of the disk 15 in cooperation with an engagement of the through hole 34 and the protruding portion 35.

FIG. 5 shows a sectional view taken along a line V-V in FIG. 4 by omitting the lever 18. As shown in FIG. 5, the disk 15 and the slider piece 10 is disposed so as to interpose the chain cover 2. Although it is not shown in FIG. 5, the protrusion 10*a* of the slider piece 10 is in contact with the outer circumference face of the spiral guide groove 16 in the spiral guide groove of the disk 15. Alternatively, it is possible to construct the protrusion 10*a* of the slider piece 10 so as to be pressed and moved by an inner circumference face of the spiral guide groove 16 while the protrusion 10*a* is in contact with the inner circumference face of the spiral guide groove 16.

In order to bring the protrusion 10*a* into contact with the spiral guide groove 16, it is possible to adopt a construction in which the spring 14 shown in FIG. 7 is disposed as a tension spring between the chain cover 2 and the slider piece 10 or a construction in which the spring 14 is disposed as a compression spring between an end portion of the slider piece 10 on an opposite side of the screw portion 13*a* of the guide pin with the screw 13.

Figure 14:
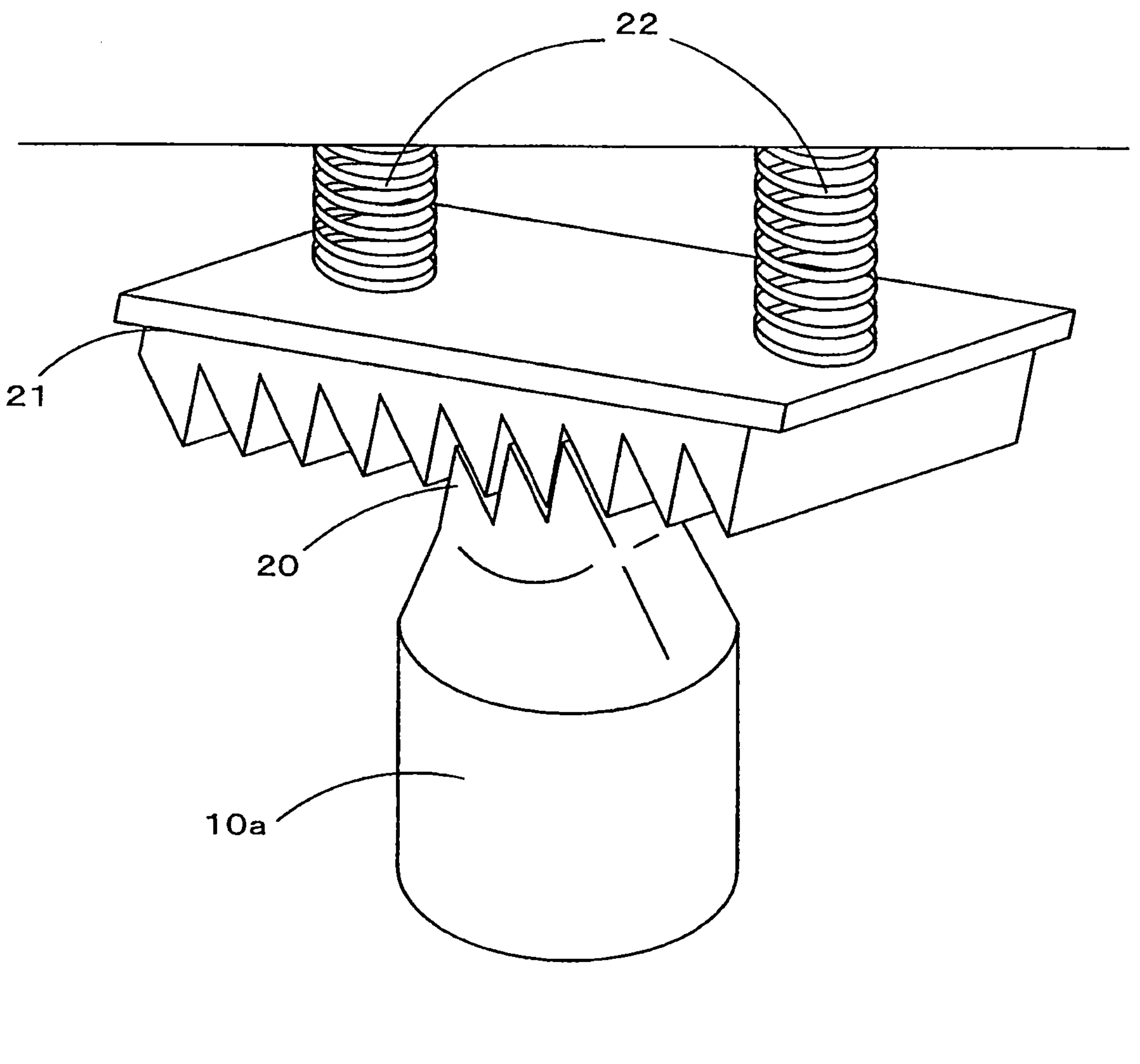
FIG. 14 It is a perspective view of a major portion showing a ratchet mechanism according to this embodiment.

As shown in FIG. 14, a ratchet mechanism can be constructed by forming a pawl 20 on a front end of the protrusion 11*a* of the tensioner 11 and engaging the protrusion 11*a* going through the unshown hole of the guide bar with a pawl portion of a pawl receiving member disposed on the unshown engine case 1. In this case, it is preferable to urge the pawl receiving member 21 by a spring 22 so as to appear and disappear freely from the engine case 1, and to dispose the spring 22 so that the pawl portion of the pawl receiving member 21 inclines downward in a sliding direction by the spiral guide groove of the disk 15. Further, the pawl receiving member 21 can be formed in a flat shape or a pole shape having the pawl portion on an outer circumference face thereof for engaging with the pawl 20.

With this ratchet mechanism, the protrusion 11*a* of the tensioner 11 can be prevented from retreating from a position slid by the spiral guide groove 16 of the disk 15, thereby maintaining tension of the saw chain provided by the guide bar 3.

In the above-mentioned embodiment, the spiral guide groove 16 is formed outward from the rotation center of the disk 15 in a clockwise direction, and when the disk 15 is rotated in the clockwise direction in FIG. 7, the protrusion 10*a* protruded from the slider piece 10 moves outward from the center of the disk 15. However, it is possible to construct to rotate the disk 15 in a counterclockwise direction in FIG. 7 so that the protrusion 10*a* of the slider piece 10 moves toward the center from an outside of the disk 15. In this case, it is also necessary to move the slider piece 10 in a left direction in FIG. 7.

Figure 15:
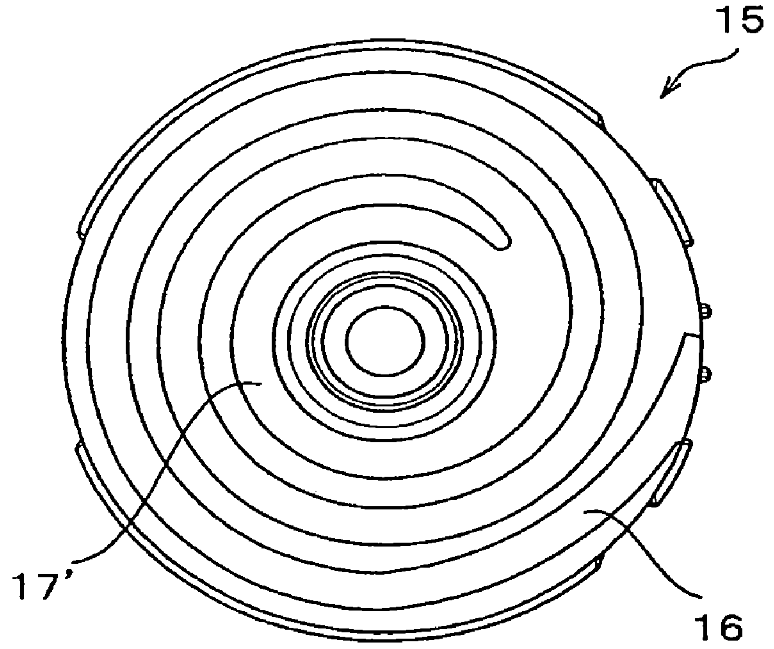
FIG. 15 is a plan view showing a feature of a spiral guide groove of a disk in a modified embodiment of the above-mentioned first embodiment.
Figure 16:
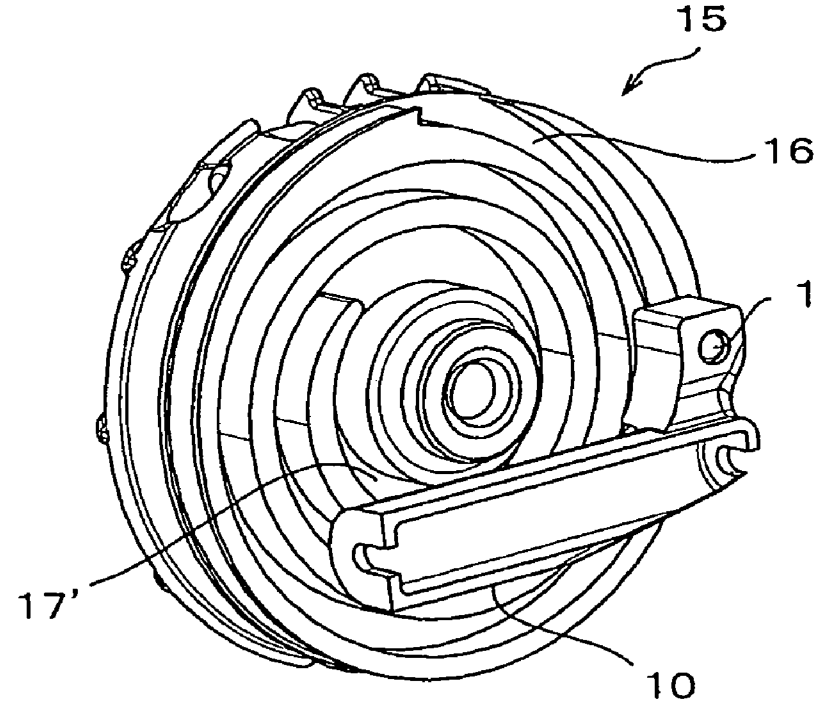
FIG. 16 is a disassembled perspective view showing an arrangement example of the disk and a slider piece according to the modified embodiment.

FIGS. 15 and 16 show a modified example of the above-mentioned first embodiment in which the protrusion 10*a* of the slider piece 10 moves toward the rotation center from an outer circumference side of the disk 15.

As shown in these drawings, the spiral guide groove 16 formed in the disk 15 is formed in the counterclockwise direction from the rotation center toward the outer circumference side. On the other hand, as shown in FIG. 16, the protrusion 10*a* which contacts with the spiral guide groove 16 of the slider piece 10 is disposed on a right end portion of the slider piece 10 which is opposite to the case in the first embodiment. The slider piece 10 and an unshown spring are stored in the guide portion (omitted in the drawing) formed at the chain cover 2 (omitted in the drawing), as similar as those shown in FIG. 7.

The tensioner 11, the coin spring 12 and the guide pin with the screw 13 (see FIG. 17) that have same constructions as those in the first embodiment and are omitted to be shown in the drawings are attached to the slider piece 10. Although it is omitted in the drawings, a protrusion is protruded on the tensioner which is inserted into an unshown hole formed in the guide bar 3 as is a case with the first embodiment. Furthermore, although the outermost circumference groove 17 of the spiral guide groove 16 is formed as an annular groove in the first embodiment, an innermost circumference groove 17' of the spiral guide groove 16 is formed as an annular groove in this modified embodiment.

With the above-mentioned feature, as is a case with the first embodiment, by simply rotating the disk 15, it is possible to securely and strongly fix the chain cover and the guide bar 3 to the engine cover without any tools while providing a tension to the chain and adjusting it at a same time.

FIG. 17 shows another modified example in which the protrusion 10*a* of the slider piece 10 is moved from the inner circumference side to the outer circumference side of the disk 15. A construction of the disk 15 and a basic construction of the auto tensioner of this modified example are not substantially different from those of the first embodiment. However, the tensioner of this modified example is attached to the engine cover 1 instead of the chain cover 2.

A construction of this modified example is described base on FIG. 17 with reference to the FIG. 1. The drawing shows an disassembled view of a state in which the protrusion 10*a* protruded forward from a rear side of the slider piece 10 mounted to the engine cover 1 is engaged in the spiral guide groove 16 formed on a rear face of the disk 15. In the drawing, although the chain cover is omitted to be shown, it is disposed between the guide bar 3 and the disk 15 as shown by virtual lines in the drawing. By rotating the disk 15, the saw chain is provided with a required tension while the unshown chain cover and the guide bar 3 is fixed to the engine cover 1.

At a part of an attaching face of the guide bar of the engine cover 1, a guide portion 1*a* for slidably storing the slider piece 10 is formed. In the guide portion 1*a*, the slider piece 10 and the spring 14 for urging the slider piece 10 in a left direction in FIG. 17 so that the slider piece 10 is positioned at an initial position. In the slider piece 10, the tensioner 11 which has a same construction as the one in the first embodiment is stored and the protrusion 11*a* thereof engages with a hole 7 formed in the guide bar 3.

The protrusion 10*a* of the slider piece 10 is in contact with the inner circumference face at a center of the spiral guide groove 16 formed in the disk 15 by an urging of the spring 14 at an initial stage. The protrusion 10*a* protrudes forward from the slider piece 10 so as to go through the guide bar 13 and the unshown chain cover unlike the first embodiment. Since the protrusion 10*a* moves along the guide slit 8 of the guide bar 3, an unshown elongated hole in which the protrusion 10*a* can go through and slide is formed at a part corresponding to the unshown chain cover for allowing a movement of the protrusion.

Furthermore, the contact point of the protrusion 10*a* and the spiral guide groove 16 is disposed on a diameter crossing the rotation center of the disk 15, and the protrusion 10*a* moves on the diameter according to the rotation of the disk 15. As described beforehand, the outer circumference face of the spiral guide groove 16 means an outer wall face of one of the pair of the spiral walls forming the guide groove 16, the one of the pair of the spiral walls being disposed inside of the other one of the spiral walls.

An unshown nut for screwing together with the stud bold 6 provided on the engine cover 1 is attached at the rotation center of the disk 15 so as to fix the unshown chain cover to the engine cover 1 by the rotation of the disk, and press and hold the guide bar 3 with respect to the guide plate 4. To facilitate this feature, an unshown through hole for the stud bolt is formed at a part of the chain cover corresponding to the stud bolt.

In FIG. 17, by rotating the disk 15 in the clockwise direction, the protrusion 10*a* that is in contact with the outer circumference face of the spiral guide groove 16 is guided by the spiral guide groove 16 so as to move toward the outer circumference side while resisting the urging of the spring 14. According to a movement of the protrusion 10*a*, the slider piece 10 moves in a right direction in the guide portion 1*a* of the engine cover 1. The tensioner 11 is pulled via the coil spring 12 and moves in the right direction with the slider piece 10. By a movement of the tensioner 11, the guide bar 3 engaging with the protrusion 11*a* is moved in the right direction. The saw chain is provided with a desired tension by a movement of the guide bar 3 in the right direction.

After the saw chain is provided with the desired tension, if the disk 15 is rotated so that the protrusion 10*a* is further moved in the right direction by the spiral guide groove 16, it is guided to the outermost circumference groove 17 and reciprocate within a certain range since the outermost circumference groove 17 is formed in an annular shape as in the case with the first embodiment. That is, after the protrusion 10*a* reaches the outermost circumference groove 17, the protrusion 10*a* maintains a state in which it slidably contacts with the outer circumference face in the annular shape of the outermost circumference groove 17, even if the disk 15 is rotated.

At this time, as a case may be, the slider piece 10 slightly moves with the protrusion 10*a* in right and left directions in FIG. 17. However, although a force with respect to the guide bar in the right direction is slightly weaken, a position of the guide bar 3 is barely changed since a movement of the protrusion 11*a* engaging with the guide bar 3 is absorbed by the coil spring 12. As a result, the protrusion 10*a* is restricted to move beyond a prescribed amount by the outermost circumference groove 17 in the annular shape. Therefore, after the protrusion 10*a* reaches to the outermost circumference groove 17, the rotation of the disk 15 is used to fix the chain cover to the engine cover 1 and fix and hold the guide bar 3, and thus, the chain cover and the guide bar 3 is fixed more securely while keeping providing the saw chain with the desired tension.

And now, in the above-mentioned first embodiment and the modified examples thereof, by rotating the disk 15 and using a screwing with the stud bolt 6 fixed to the engine cover 1, the chain cover 2 and the guide bar 3 are fixed to the engine cover at one portion. However, it is possible to fix the chain cover 2 and the guide bar 3 to the engine cover 1 at plural portions by rotating the disk 15.

Figure 18:
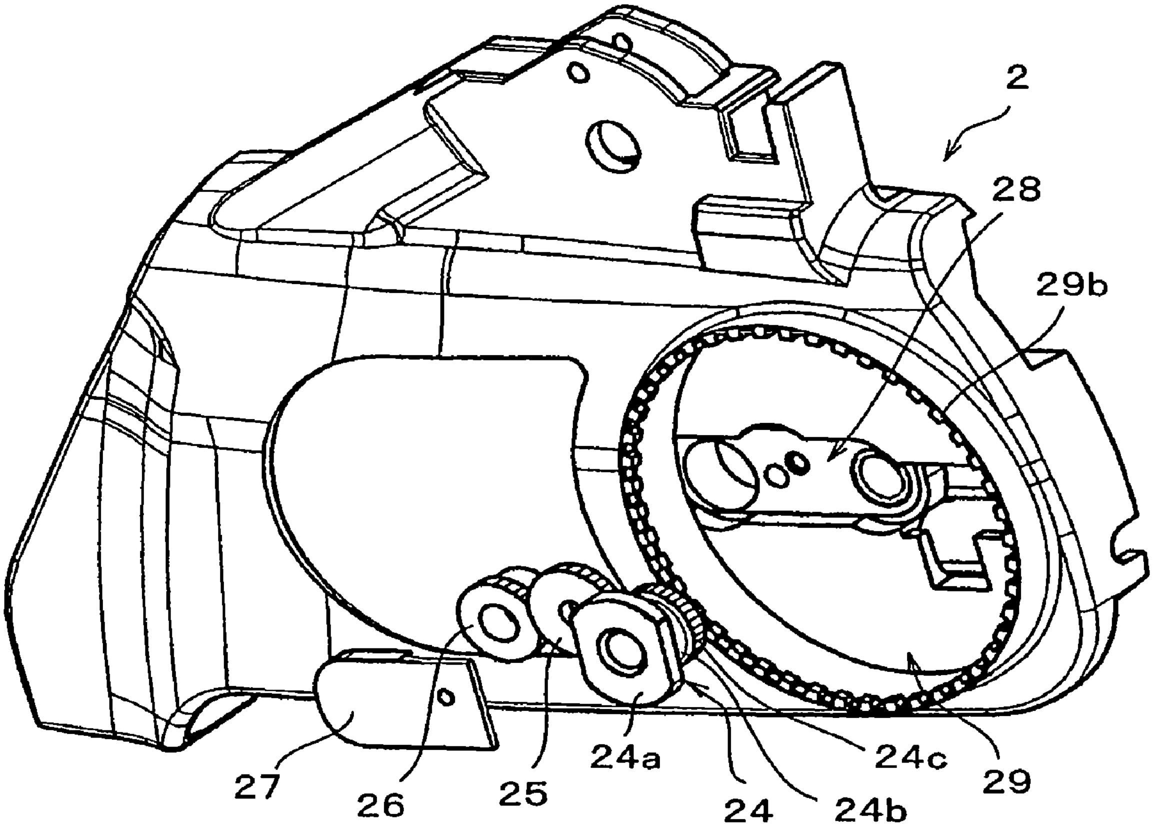
FIG. 18 is a disassembled perspective view showing an example of a fixing mechanism of a chain cover according to a second embodiment of the invention.

FIG. 18 shows a second embodiment wherein the chain cover 2 and the guide bar 3 is fixed to the engine cover 1 at the plural portions. According to this embodiment, the nut 23 provided at the center of the disk 15 in the first embodiment is excluded and a nut member 24 is formed apart from a main body of the disk 15. Therefor, although the disk according to this embodiment is omitted to show in a drawing, an unshown fixing hole for inserting and fixing the nut member 24 is formed at the rotation center of the disk. Except for forming the fixing hole, a construction of the disk is not substantially different form that of the first embodiment.

The nut member 24 comprises a head portion 24*a*, an axis portion 24*b* projected at a center of the head portion 24*a* and an external tooth gear 24*c* provided at an end of the axis portion 24*b*. In a center of the external tooth gear 24*c*, an unshown inside screw is provided so as to screw together with a stud bolt projected from an unshown engine cover for fixing. The head portion 24*a* has a shape in which parts of a circular ark opposing each other interposing a center of a disk are cut off, and is held and fixed to the unshown fixing hole formed in the center of the disk and having a same shape as the head portion 24.

In this embodiment, an intermediate gear 25 and a nut gear engaging with the intermediate gear 25 are provided. The head portion 24*a* of the nut member 24 has a length that allows a part of the head portion 24*a* to project forward relative to the intermediate gear 25 or the nut gear 26 so that, when the head portion 25 is engaged with the fixing hole, the external tooth gear 24*c*, the intermediate gear 25, and the nut gear 26 can work in an interlocking manner. As a result, when the external tooth gear 24*c*, the intermediate gear 25, and the nut gear 26 are in an engaging state, steps are generated among the external tooth gear 24*c*, the intermediate gear 25, and the nut gear 26. A cover piece 27 is fixed so as to cover the intermediate gear 25 and the nut gear 26.

In this embodiment, another unshown stud bolt is provided in parallel with the above-mentioned stud bolt in the engine cover so as to screw together with the unshown inside screw formed in a center portion of the nut gear 26. On the other hand, at a bottom of the concave portion 29 in which the unshown disk of the chain cover 2 is inserted, there is formed a pocket portion 28 in which the nut member 24, the intermediate gear 25 and the nut gear 26 are stored in an engaged state in order while three holes for rotatably supporting the external tooth gear 24*a*, the intermediate gear 25 and the nut gear 26 are formed.

Now, the external tooth gear 24*c*, the intermediate gear 25 and the nut gear 26 are rotatably stored in the pocket portion 28 of the chain cover 2 in the engaging state and insert the unshown disk into the concave portion 29 of the chain cover 2. At a same time, the nut member 24 is inserted into and fixed to the unshown fixing hole formed on the rotation center of the disk while inside screws of the nut member 24 and the nut gear 26 are screwed together with two unshown stud bolts projecting forward from right and left holes of the pocket member 28.

When the disk is rotated in this condition, the nut gear 26 is rotated in one direction via the intermediate gear 25 according to a rotation of the external tooth gear 24*a* so as to fix the chain case 2 and the unshown guide bar to the unshown engine cover at two portions. In this embodiment, other constructions except for this interlocking feature are not substantially different from those of the first embodiment and thus, operation to provide the tension to the chain and operation to adjust it by the guide bar are carried out at a same time as the above-mentioned fixing. As aforementioned, in this embodiment, at a same time when the operation to provide the tension to the chain and the operation to adjust it are carried out in a same way as the first embodiment, the chain cover and the guide bar are positively fixed at the two portions by simply rotating the disk, which intensively enhances a fixing force.

In an example shown in the drawing, a gear mechanism is adopted as the interlocking mechanism, however, for example, a belt transmission mechanism may be used instead of the gear mechanism. Furthermore, the gear mechanism carries out a transmission by three gears, however, if a number of gear is increased, it is possible to fix the chain cover and the guide bar to the engine cover at more than three portions.

Next, a third embodiment is explained with reference to FIG. 19 wherein a link mechanism is used as means for a sliding of the slider piece 10, a fixing of the chain cover 2 and a fixing of the guide bar 3. Constructions of the slider piece 10 and the tensioner 11 are same as those in a case that the disk 15 is used as a fixing means and thus, same referential numerals are given to same members having same features as those in FIGS. 1 to 13, and thus descriptions thereof are omitted.

Figure 19:
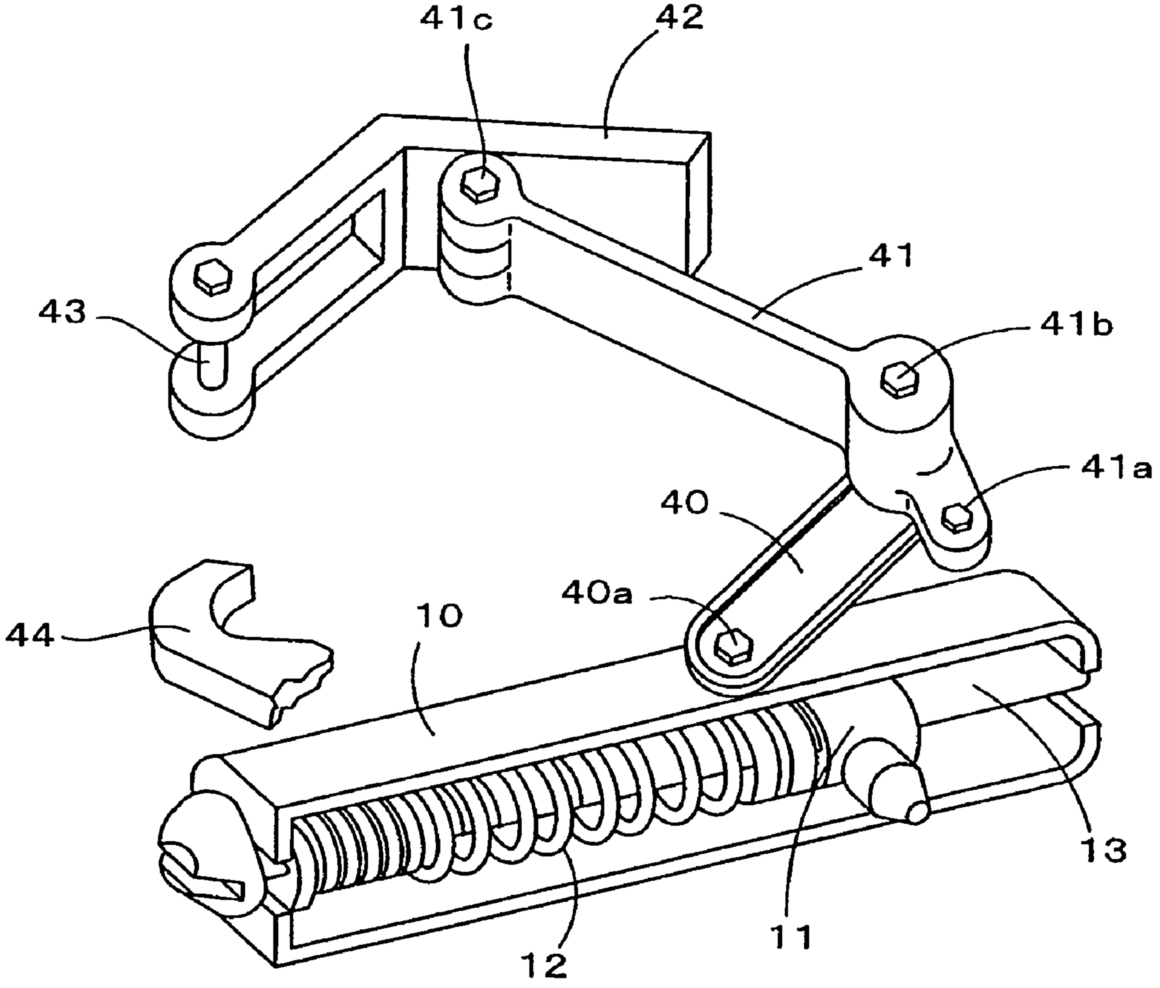
FIG. 19 is a disassembled perspective view showing a major portion of a link mechanism according to a third embodiment of the invention.

As shown in FIG. 19, the slider piece 10 is slidably disposed in an unshown chain cover. Further, the slider piece 10 can be disposed via a return spring in the guide portion in the chain cover so as to return to the initial position easily when the chain cover is removed from the engine cover.

A link 41 is rotatably supported on the chain cover by a link axis portion 41*a*. A link 40 is rotatably supported on the slider piece 10 via a link axis portion 40*a*. These links 41 and 40 are rotatably connected via a link axis portion 41*b*. The link axis portion 40*a* can be disposed so as to slide in the elongated hole formed so as to communicate with the guide portion 9 of the chain cover 2. On another end of the link 41, the lever 42 is rotatably supported via a link axis portion 41*c*. On another end of the lever 42 bent in a substantial inverse L-shape, an engagement portion 43 is formed for engaging with a hook portion 44 erected on the engine cover.

Next, the link mechanism is described hereinafter. The link 41 is rotated by the lever in a counterclockwise direction in FIG. 19 with the link axis portion 41*a* as a center thereof 42 so that the engagement portion 43 engages with the hook portion 44. At this time, the slider piece 10 is slid in a left direction in FIG. 18 by the link 40, thereby moving the guide bar engaging with the protrusion 11*a* of the tensioner 11 in a direction to provide the tension to the saw chain.

Then, by further rotating the lever 42 with the link axis portion 41*c* as the center thereof in a clockwise direction in FIG. 19, the chain cover is fixed to the engine cover while the guide bar is fixed to an engine cover side. Changing a lever ratio can also restrain prevention of a guide bar's relaxation.

As the link mechanism, besides the mechanism shown in FIG. 19, any link mechanism can be adopted as long as it enables a fixing of the chain cover to the engine cover and sliding of the slider piece.

Figure 20:
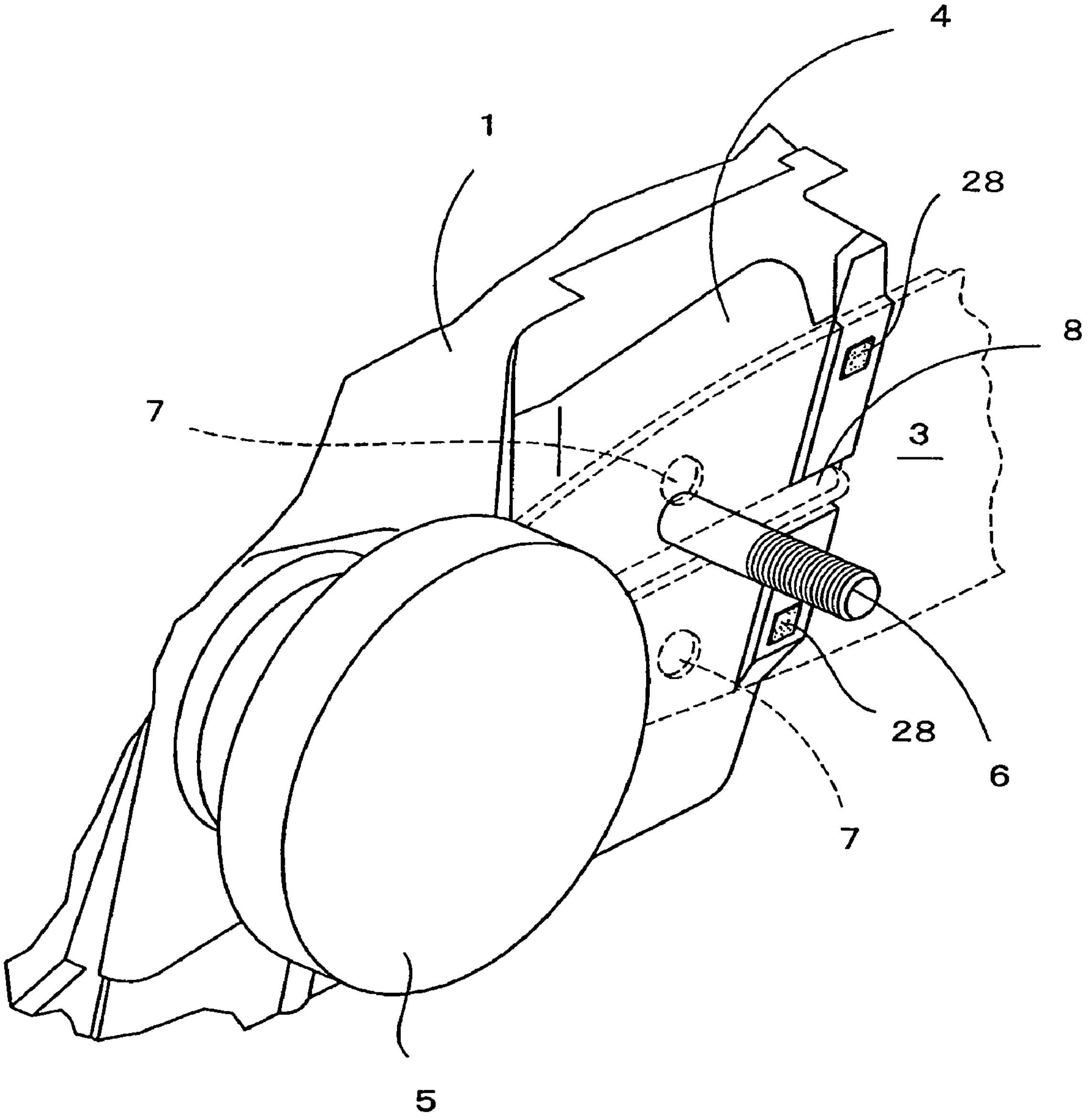
FIG. 20 is a perspective view viewed from inside of an engine cover showing an example of temporary fixing means of a fourth embodiment of the invention.
Figure 21:
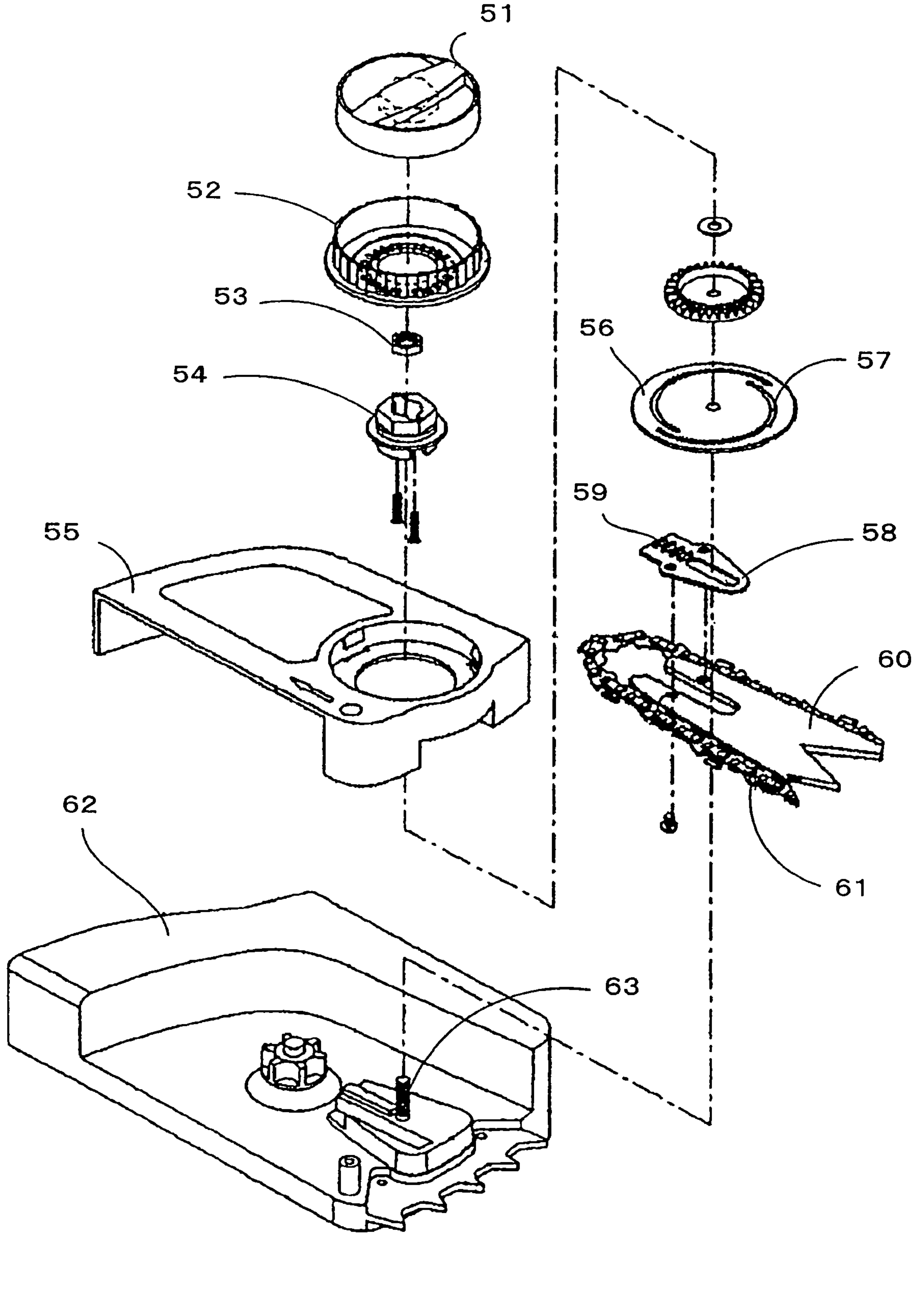
FIG. 21 PRIOR ART
FIG. 21 is a disassembled perspective view of a conventional art.
Figure 22:
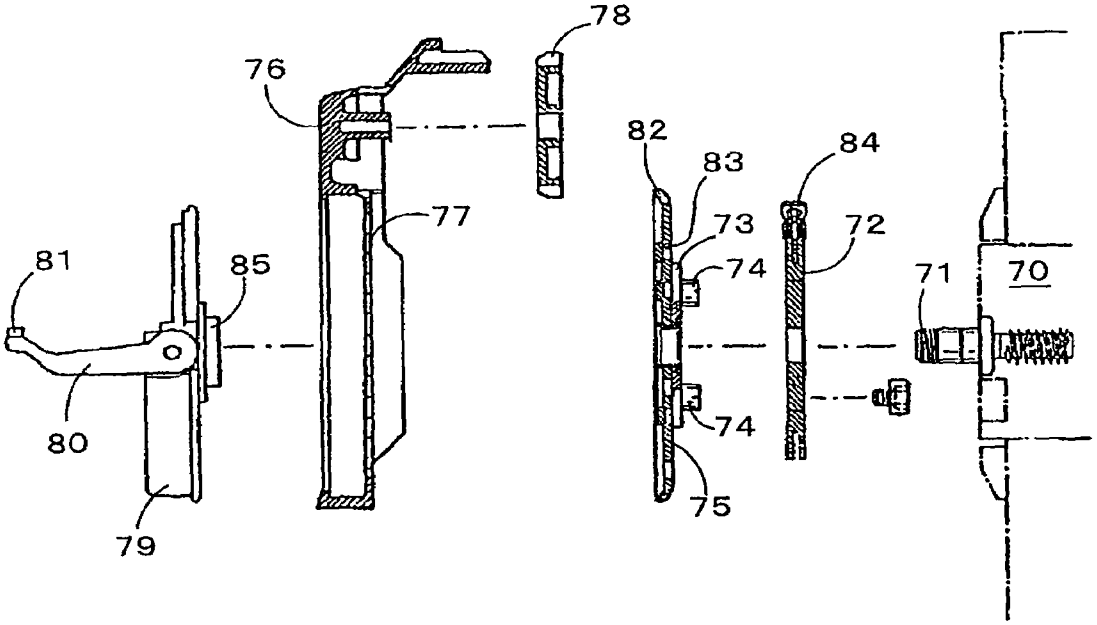
FIG. 22 PRIOR ART
FIG. 22 is a disassembled perspective view of another conventional art.

FIG. 20 shows an embodiment wherein a function facilitating a mounting of the chain to the guide bar is added to the auto chain tensioner of the aforementioned invention.

Generally speaking, in order to mount a chain to a chain saw, a stud bolt of an engine cover is inserted into a slit formed in an end portion of a metal guide bar and a chain cover and a disk are attached to the engine cover. For carrying out this attachment, the disk rotatably attached to the chain cover is rotated as aforementioned and the nut portion of the disk is loosely inserted into the stud bolt of the engine cover so as to temporarily fix the chain cover and the guide bar. Then, the saw chain is, for example, hung around a clutch 5 having a driving pulley shown in FIG. 6 and a part of the guide groove formed at an outer circumference of the guide bar 3. According to the invention, the disk is rotated again in this state so as to linearly move the guide bar 3 in a longitudinal direction and provide the required tension to the saw chain while the chain cover and the guide bar are fixed to the engine cover.

By the way, when the saw chain is mounted on the guide bar of the chain saw, the chain cover and the guide bar are temporarily fixed to the engine cover as aforementioned. In this state, a large gap remains between the chain cover and the engine cover, an end of the guide bar is caught on a part of the clutch 5 with the driving pulley and thus, the guide bar is tend to rattle between the chain cover and the engine cover. When the saw chain is hung along an outer circumference of the guide bar while the saw chain is hung around the clutch 5 with the driving pulley in this state, since the saw chain is not provided with the tension, even if the saw chain is successfully hung around at one end, it slips off at the other end. Further, even if the saw chain is successfully inserted into and fixed to the guide groove at the other end, it slips off at the one end, or the like. Consequently, it is not easy to completely hang the saw chain around the clutch with the driving pulley and a whole area of a partial hanging area of the guide bar.

FIG. 20 shows a fourth embodiment of the invention wherein the above-mentioned problem at a time of hanging the saw chain is solved and easy operation of hanging the saw chain is enabled. In this embodiment, as shown in FIG. 20, one or more permanent magnet piece 28 as an example of the temporary fixing means is fixed on the contact face of the engine cover 1 which contacts the guide bar. It is preferable to attach the permanent magnet piece 28 to the contact face of the engine cover 1 which contacts the guide bar in such a manner that an attaching face of the permanent magnet piece 28 and the contact face contacting the guide bar lie on a same plane. Furthermore, a magnetic attraction of the permanent magnet piece 28 is required to be strong enough to hold the guide bar 3. If the magnetic attraction is not sufficient, two or more permanent magnet piece 28 may be disposed on the contact face contacting the guide bar.

As aforementioned, by adopting an easy construction wherein the permanent magnet piece 28 is fixed on the contact face contacting the guide bar of the engine cover 1, facility in mounting the chain more than expected is secured. The large gap remains between the unshown chain cover and the engine cover when mounting the saw chain as aforementioned and the guide bar 3 tends to rattle between the chain cover and the engine cover 1 with one end thereof as a base end. However, according to this embodiment, since guide bar 3 is attracted to the permanent magnet piece 28, attached face-to-face, and tightly held on the contact face of the engine cover 1 contacting the guide bar, which restricts an unnecessary movement, it is possible, for example, for a person unfamiliar with operation to mount the chain to easily hung the saw chain around the clutch with the driving pulley and the whole area of the partial hanging area of the guide bar.

In the example shown in the drawing, the permanent magnet piece 28 is used, however, for example, an unshown leaf spring may be used instead of the permanent magnet piece 28. In a case that the leaf spring is used, an end of the leaf spring is fixed on a side of the contact face of the unshown chain cover contacting the guide bar 3 and the chain cover is temporarily fixed to the engine cover in the aforementioned manner, the guide bar 3 is elastically pressed toward the contact face of the engine cover 1 contacting the guide bar and held by the other end of the leaf spring.

Furthermore, in the aforementioned fixing means of the invention, in order to describe the embodiments using the disk or the link mechanism as the fixing means, it is described that the protrusion 10*a* formed in the slider piece engages in the spiral guide groove of the disk 15 and the lever 40 of the link mechanism is supported by the slider piece. However, the invention is not limited to these embodiments, but it is also possible to adopt a construction in which the protrusion 11*a* of the tensioner 11 engages in the spiral guide groove of the disk 15, or a construction in which the lever 40 is supported by the tensioner 11. The invention naturally includes these cases.

As understood by the foregoing description, according to the invention, the tension is automatically provided to the saw chain only by a process of fixing the chain cover to the engine cover. Furthermore, it is possible to fix the chain cover without any tools and finely adjust the tension of the saw chain. Further, it can be constructed so as to provide an optimal tension from a beginning by restricting a screw head shape of the screw portion of the coil spring of the guide pin with the screw.

By changing a shape of the spiral guide groove of the disk and the lever ratio of the link mechanism, it can be constructed so as to restrain the prevention of the guide bar's relaxation. Furthermore, it is possible to prevent the guide bar from retreating by forming the pawl on the protrusion or the like of the tension engaging with the guide bar and disposing the pawl receiving member engaging with the pawl on a side of the engine cover.

The invention claimed is:

1. A chain saw comprising an auto chain tensioner, the auto chain tensioner comprising:

a guide bar for providing a tension or a relaxation to a saw chain running along the guide bar, a single chain cover fixing means for pressing and holding the guide bar between an engine case and a chain cover and for fixing the chain cover to the engine case, a slider piece which is disposed between the chain cover and the guide bar and slides linearly along back and forth moving direction of the guide bar, a tensioner which is slidable along a sliding direction of the slider piece, and a spring for connecting the slider piece and the tensioner, wherein the chain cover fixing means further includes a rotatable disk having a sliding mechanism for allowing one of the slider piece and the tensioner to slide along the back and forth moving direction of the guide bar, and the sliding mechanism forms a spiral guide groove on the disk, said spiral guide groove being engaged with a protrusion provided in one of the slider piece and tensioner, wherein the other one of the tensioner and the slider piece is engaged with the guide bar, and wherein said spring for connecting the slider piece and the tensioner is a coil spring, one end of the coil spring is fixed to the tensioner, and the other end of the coil spring is coupled to the guide bar with a screw portion coupled to the slider piece directly or via a screw portion attached to the end of the coil spring, said screw portion having a screw head accessible to allow external rotational operation, said screw portion moving axially with said slider piece upon rotation of said disk, and rotation of said screw head causing the other end of the coil spring to advance along said screw portion.

2. The chain saw comprising the auto chain tensioner according to claim 1, further including a stud bolt for guiding the guide bar fixed to an engine case side.

3. The chain saw comprising the auto chain tensioner according to claim 2, wherein one of an outermost circumference and an innermost circumference of the spiral guide groove is formed in an annular groove.

4. The chain saw comprising the auto chain tensioner according to claim 3, wherein the slider piece and the tensioner are non-rotatably and slidably located within said chain cover; and the screw portion coupled to the slider piece is rotatably supported by the slider piece.

* * * * *